(12) United States Patent
Burgess et al.

(10) Patent No.: US 8,132,786 B2
(45) Date of Patent: Mar. 13, 2012

(54) STEMLESS BALL VALVE

(75) Inventors: Kevin Burgess, Sheridan, WY (US);
David Yakos, Bozeman, MT (US);
Bryan Walthall, Bozeman, MT (US)

(73) Assignee: Big Horn Valve, Inc., Sheridan, WY (US)

( * ) Notice: Subject to any disclaimer, the term of this patent is extended or adjusted under 35 U.S.C. 154(b) by 55 days.

(21) Appl. No.: 12/890,645

(22) Filed: Sep. 25, 2010

(65) Prior Publication Data
US 2011/0180739 A1 Jul. 28, 2011

Related U.S. Application Data

(63) Continuation-in-part of application No. 12/331,387, filed on Dec. 9, 2008, now Pat. No. 7,971,855.

(51) Int. Cl.
*F16K 5/06* (2006.01)

(52) U.S. Cl. ............... 251/315.1; 251/315.16; 251/340; 251/341

(58) Field of Classification Search .......... 251/315.01, 251/315.1, 315.16, 340, 341, 352
See application file for complete search history.

(56) References Cited

U.S. PATENT DOCUMENTS

| | | | |
|---|---|---|---|
| 2,482,780 A | 9/1949 | Kirby, Jr. | |
| 3,194,534 A | 7/1965 | Sachnik | |
| 3,206,160 A * | 9/1965 | Bennett | ........................... 251/65 |
| 3,771,545 A | 11/1973 | Allen | |
| 3,776,507 A | 12/1973 | Tomlin et al. | |
| 3,830,465 A | 8/1974 | Allen | |
| 4,819,689 A | 4/1989 | Owsley et al. | |
| 5,113,831 A | 5/1992 | Grant | |
| 5,114,412 A * | 5/1992 | Flinchbaugh | ................. 604/247 |
| 7,306,010 B2 | 12/2007 | Gruener, Sr. | |
| 7,504,599 B1 | 3/2009 | Chesters | |
| 2004/0256004 A1* | 12/2004 | Kessell et al. | ................ 137/68.3 |
| 2008/0258090 A1 | 10/2008 | Najmolhoda et al. | |
| 2009/0184182 A1 | 7/2009 | Beeren | |

* cited by examiner

*Primary Examiner* — John Bastianelli
(74) *Attorney, Agent, or Firm* — Antoinette M. Tease

(57) ABSTRACT

A stemless ball valve comprising: a right flange; left flange; ball with an axis pin and two travel pins; ball seal on either side of the ball; guide sleeve with inner walls comprising two channels; cartridge guide holder; inner magnetic cartridge; and outer magnetic cartridge. The ball is situated inside of the guide sleeve, and a travel pin is located in each of the two channels. The guide sleeve is situated inside of the cartridge guide holder, which is located adjacent to and outside of the inner magnetic cartridge and secured to the inner magnetic cartridge such that when the inner magnetic cartridge rotates, the cartridge guide holder also rotates. The cartridge guide holder is secured to the guide sleeve such that when the cartridge guide holder rotates, the travel pins move within the channels in the inner walls of the guide sleeve, thereby causing the ball to rotate.

10 Claims, 43 Drawing Sheets

STEMLESS BALL VALVE

CROSS-REFERENCE TO RELATED APPLICATION

This application is a continuation-in-part of U.S. patent application Ser. No. 12/331,387 filed on Dec. 9, 2008, the contents of which are incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. NNJ07JA20C awarded by NASA Lyndon B. Johnson Space Center of Houston, Tex.

BACKGROUND OF THE INVENTION

1. Field of the Invention

The present invention relates generally to the field of valves, and more particularly, to a stemless ball valve.

2. Description of the Related Art

Valves have been used for centuries in many different ways to control fluids. Fluid technology has progressed, especially since the Industrial Revolution. As a result, a great variety of uses have been found for valves. Some of these uses include pneumatic and motor-driven actuation with controllers that are regulated by a computer. By and large, however, the basic flow design of valves has stayed relatively constant along four basic lines.

The first of these is the gate valve. It is simple in design, inexpensive to make, and can be used in a variety of applications. A gate valve typically contains a circular disk known as the gate. It is mounted perpendicular to the pipe containing the fluid. Reciprocal actuation guides the gate up and down into the seat of the valve to either open the flow path for full flow or to close it down. Because of inherent deficiencies in design, gate valves are rarely used to modulate the rate of flow of fluid through the valve.

A second typical style of valve is the globe valve. These valves are very good at throttling, but with reduced flow capabilities. The path of the fluid through the valve is tortuous, and as a result, these valves do not allow as much fluid flow for a given size as the other basic valve designs.

A third (and the most popular) design is the ball valve. The valve actuator is connected by a valve stem to a ball inside the valve. The ball has a large hole bored inside of it from one side to the other. Rotating the ball allows for this hole to be aligned with the incoming and outgoing flow path. In the closed position, the ball opening is rotated perpendicular to the flow path and completely shuts off the flow of fluid. "Full port" ball valves have a hole that is the same diameter as the incoming and outgoing pipelines. This is the most efficient of all valves—the one that offers the least resistance to the flow of the fluid in the fully open position.

A fourth basic type of valve is known as the butterfly valve. The butterfly valve has an internal seat that is perpendicular to the flow of the fluid. The valve stem connects to and rotates a circular disk inside the valve to engage the seat to block fluid flow. A butterfly valve generally has high flow rates like the ball valve, but unlike the ball valve, the circular disk stays in the fluid path and can catch debris that might be present in the fluid.

All of the above-mentioned valve types require stems. The stem is the component that transfers mechanical action from outside of the valve to the inside, effecting a change in the flow of the fluid through the valve. All valve stems penetrate the body of valves, and this necessitates a sealing device or packing around the stem to prevent the internal fluid of the valve from leaking to the outside through the stem hole. There is a constant quest for better sealing methods around valve stems, especially today when the leakage of hazardous fluids can damage the environment or injure people in the vicinity of the valve. Valve stem leakage is also the major cause of air pollution or fugitive emission discharges from refiners and chemical process systems. There are even secondary containment systems developed to contain potential leakage from valve stems. For example, bellows are used on reciprocally actuated valve stems (gate and globe types) to encase the stem and the packing within it. The pleats of the bellows expand and contract just like the pleats on an accordion to accommodate the motion of the valve stem. Unfortunately, bellows and other types of containment can fail, resulting in a catastrophic release of fluid entrapped between the valve stem and the containment unit.

With the advent of modern powerful magnetic materials, it is now possible to actuate the internals of a valve without the use of a valve stem. By using magnetic fields to transfer mechanical power to the internal mechanism of a valve, it is no longer necessary to penetrate the body of the valve with a stem hole.

The valve described in U.S. Pat. No. 6,109,293 (Walrath et al., 2000) represents a significant improvement over stemmed valves. This patent utilizes modern permanent magnets to transfer the necessary torque to the valve internals without the use of a valve stem. Internally the valve stem consists of an offset venturi that has been split at the most restrictive point in the venture passage. By rotating one side or the other, this configuration becomes a valve capable of controlling fluid flow. The mechanical energy applied to the outside array of permanent magnets is transferred to an internal array of magnets that initiate the rotational movement required by the valve.

Other variations of this design employ a rotating disk or wafer, but the basic principal of operation remains the same, relying on magnetic fields rather than a valve stem to actuate the valve. Unfortunately, the seal designs employed in these embodiments are prone to failure under high flow conditions and simply cannot compete with the standard seal designs employed by the other valve types.

Accordingly, it is an object of the present invention to incorporate accepted and proven ball valve sealing technology into a stemless valve design that can be used to control fluids. Between fifty and seventy percent of all valve maintenance is associated with packing or mechanical seal failure on valve stems; therefore, it is a further object to provide a valve that avoids this maintenance by eliminating the valve stem entirely while still providing a high level of fluid control.

BRIEF SUMMARY OF THE INVENTION

The present invention is a stemless ball valve comprising: a first flange; a second flange; a ball; two ball seals; a guide sleeve; an inner housing; an inner magnetic cartridge comprising a plurality of inner magnets; an outer housing comprising a plurality of outer magnets; two axis pins; and two travel pins; wherein the ball lies between the first and second flanges with a ball seal on either side of the ball; wherein the axis pins each comprises a first end and a second end, and the first end of each axis pin is fixedly attached to the ball; wherein the second end of one of the two axis pins is lodged into a notch in the first flange and the second end of the other axis pin is lodged into a notch in the second flange; wherein the inner housing lies between the inner magnetic cartridge and the outer magnets of the outer housing; wherein the first and second flanges are fixedly attached to the inner housing; wherein a handle is attached to the outer housing, and when the handle is turned, the outer magnets of the outer housing cause the inner magnetic cartridge to rotate in the same direction as the handle; wherein the guide sleeve is fixedly attached to the inner magnetic cartridge such that when the inner magnetic cartridge rotates, the guide sleeve also rotates; wherein the guide sleeve surrounds the ball and comprises two channels; wherein the travel pins each comprises a first end and a second end, and the first end of each travel pin is fixedly attached to the ball; wherein the second end of one of the travel pins is situated in one of the channels in the guide sleeve, and the second end of the other travel pin is situated in the other channel in the guide sleeve; wherein as the guide sleeve rotates, the travel pins move up and down within the channels in the guide sleeve, thereby causing the ball to rotate.

In a preferred embodiment, the ball comprises a channel, and rotation of the ball causes the channel to be aligned or disaligned with threaded apertures in each of the first and second flanges, thereby opening and closing the valve. Preferably, the axis pins are separated from one another by one hundred eighty degrees, and the travel pins are separated from one another by one hundred eighty degrees.

In a preferred embodiment, the present invention further comprises a first internal retaining ring and a second internal retaining ring, the first and second internal retaining rings are located inside the magnetic cartridge on either side of the guide sleeve, and the purpose of the internal retaining rings is to prevent the guide sleeve from moving within the magnetic cartridge. Preferably, the inner magnetic cartridge comprises two circular recesses into which the internal retaining rings are positioned.

In a preferred embodiment, there is a slight gap between the first flange and the first internal retaining ring and between the second flange and the second internal retaining ring to allow pressure to be exerted on the ball seals. Preferably, the ball seals are situated within recesses in each of the first and second flanges.

In a preferred embodiment, the outer housing has a perimeter, the first flange comprises an external stop, and the outer housing comprises a recess that extends roughly ninety degrees around the perimeter of the outer housing and in which the external stop travels; and the external stop prevents the handle, the outer magnetic cartridge, the inner magnetic cartridge, the guide sleeve and the ball from rotating more than ninety degrees.

In a preferred embodiment, the first flange comprises an inner part with an internal recess, and the inner magnetic cartridge comprises an internal stop that fits within the internal recess; and the internal recess extends ninety degrees around the inner part of the first flange, thereby preventing the inner magnetic cartridge, the guide sleeve and the ball from rotating more than ninety degrees.

In a preferred embodiment, the angle between the axis pins and the travel pins is approximately forty-eight degrees. Preferably, the travel pins are approximately twenty-five degrees out of plane with the axis pins and the channel in the ball. Optionally, the axis pins and travel pins each comprises a tip, and the tip of each axis pin or travel pin is comprised of polytetrafluoroethylene or polychlorotrifluoroethylene.

In a preferred embodiment, the present invention is a stemless ball valve comprising: two flanges; and a ball with a channel, two axis pins and two travel pins; wherein one end of each of the axis pins and one end of each of the travel pins are fixedly attached to the ball; wherein one end of one of the axis pins is lodged into a notch in the first flange, one end of the other axis pin is lodged into a notch in the second flange, and both axis pins are allowed to rotate within the notches in the flanges; wherein the guide sleeve comprises two channels, one end of one of the travel pins is situated within one of the two channels in the guide sleeve, and one end of the other travel pin is situated within the other channel in the guide sleeve; wherein an outer magnetic cartridge causes the inner magnetic cartridge and guide sleeve to rotate; wherein when the guide sleeve rotates, the travel pins move up and down within the channels in the guide sleeve; and wherein the movement of the travel pins within the channels in the guide sleeve causes the ball to rotate, thereby opening and closing the ball valve.

In an alternate embodiment, the guide sleeve and inner magnetic cartridge are a single part.

In an alternate embodiment, the present invention is a stemless ball valve comprising: a right flange; a left flange; a ball with an axis pin and two travel pins; a ball seal on either side of the ball; a guide sleeve with inner walls comprising two channels; a cartridge guide holder; an inner magnetic cartridge; and an outer magnetic cartridge; wherein the ball is situated inside of the guide sleeve such that a travel pin is located in each of the two channels of the guide sleeve; wherein the guide sleeve is situated inside of the cartridge guide holder; wherein the cartridge guide holder is located adjacent to and outside of the inner magnetic cartridge and is secured to the inner magnetic cartridge such that when the inner magnetic cartridge rotates, the cartridge guide holder also rotates; wherein the inner magnetic cartridge is situated inside of the outer magnetic cartridge with a portion of one of the two flanges between the inner and outer magnetic cartridges; wherein rotation of the outer magnetic cartridge causes the inner magnetic cartridge to rotate; wherein the axis pin is inserted into an aperture in one of the two flanges; and wherein the cartridge guide holder is secured to the guide sleeve such that when the cartridge guide holder rotates, the travel pins move within the channels in the inner walls of the guide sleeve, thereby causing the ball to rotate.

In a preferred embodiment, the cartridge guide holder and the inner magnetic cartridge each has an outer diameter, and the outer diameter of the cartridge guide holder and the outer diameter of the inner magnetic cartridge are roughly equal. Preferably, the cartridge guide holder and the inner magnetic cartridge each has an inner diameter, and the inner diameter of the cartridge guide holder and the inner diameter of the inner magnetic cartridge are roughly equal.

In a preferred embodiment, the ball comprises a channel, and rotation of the ball causes the channel to be aligned or disaligned with apertures in the right and left flanges, thereby opening and closing the valve. Preferably, both flanges are threaded, and one flange screws into the other flange. The travel pins are preferably separated from one another by one hundred eighty degrees.

In a preferred embodiment, the channels in the guided sleeve are curved. In an alternate embodiment, the channels in the guided sleeve are straight.

In a preferred embodiment, the invention further comprises a plastic shroud that surrounds the valve. Preferably, the invention further comprises a handle and a metal shroud that is secured to the outside of the plastic shroud and comprises two pairs of locking brackets, and the handle is locked in an open or closed position with a clip or pin inserted through one pair of locking brackets.

REFERENCE NUMBERS

Figure 1:
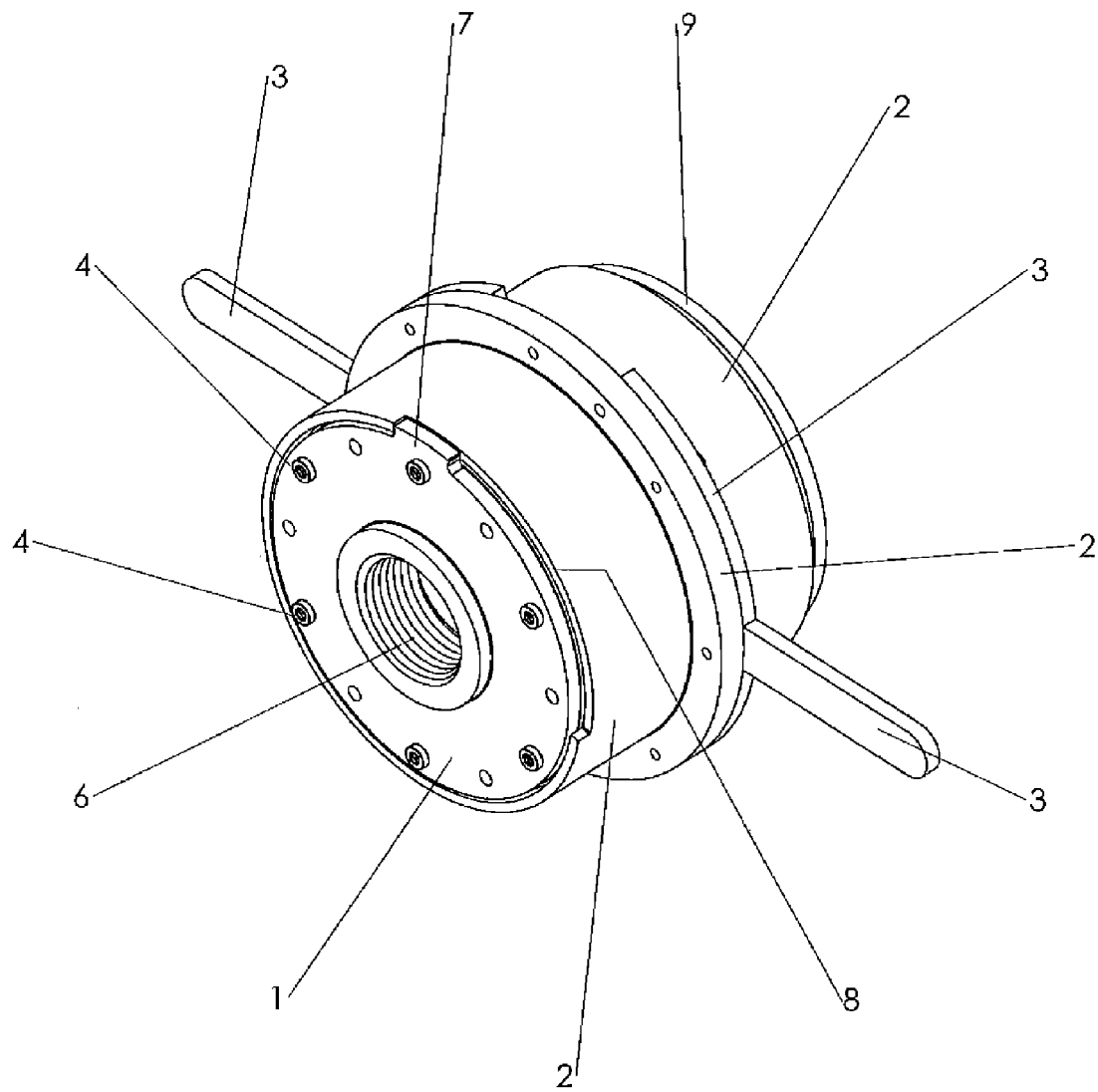
FIG. 1 is a front perspective view of the present invention fully assembled.

1 First flange
1a Inner part (of first flange)
2 Outer housing
3 Handle
4 Screw
5 Inner housing
5a Lip (of inner housing)
5b Bottom (of inner housing)
6 Threaded aperture
7 Outer stop
8 Recess (in outer housing)
9 Second flange
10 Collar
11 Ball
12 Ball seal
13 Axis pin
14 Inner magnetic cartridge
14a Recess (around perimeter of inner magnetic cartridge)
15 Channel (in ball)
16 Ramp (in flange)
17 First journal bearing
18 Second journal bearing
19 Internal stop
20 Third journal bearing
21 Fourth journal bearing
22 First half of guide sleeve
23 Second half of guide sleeve
24 First internal retaining ring
25 Second internal retaining ring
26 Pin (of guide sleeve)
27 Travel pin
28 Channel (in guide sleeve)
29 External appendage (on guide sleeve)

30 Fifth journal bearing
31 Internal recess (in first flange)
32 Notch (in first and second flanges)
33 Longitudinal recess (in inner magnetic cartridge)
34 Inner magnet
35 Outer magnet
36 Tip (of axis and/or travel pin)
37 Circular recess (in inner magnetic cartridge for internal retaining rings)
38 Recess (for ball seal)
39 Sixth journal bearing
40 Plastic shroud
41 Metal shroud
42 Handle
43 Screw
44 Locking bracket
45 Stud
46 Ball
47 Left flange
48 Ball seal
49 Right flange
49a Threaded part (of right flange)
50 Outer magnetic cartridge
51 Screw
52 O-ring
53 Inner magnetic cartridge
54 Cartridge guide holder
55 Bolt/pin
56 Recess
57 Guide sleeve
57a Channel (in guide sleeve)
58 Travel pin
59 Axis pin
60 Key slot
61 Key
62 Magnet

DETAILED DESCRIPTION OF INVENTION

FIG. 1 is a front perspective view of the present invention fully assembled. This figure shows the first flange 1, the outer housing 2, the handle 3, and the screws 4 that secure the first flange 1 to the inner housing 5 (not shown). The handle 3 is preferably secured to the outer housing 2 with screws (not shown). This figure also shows the threaded aperture 6 in the first flange 1. The threaded aperture 6 preferably has an inner diameter of 0.5 inches.

FIG. 1 also shows the outer stop 7 on the first flange 1 and the recess 8 in the outer housing 2 in which the outer stop 7 travels. As the handle 3 is turned, the outer housing 2 rotates with respect to the inner housing 5 and first and second flanges 1, 9 (both of which are fixedly attached to the inner housing 5), and the outer stop 7 moves in a clockwise or counterclockwise direction (depending on which way the handle 3 is turned) within the recess 8 in the outer housing 2. The recess 8 preferably extends roughly ninety degrees) (90°) around the perimeter of the outer housing 2 (the recess actually extends ninety degrees) (90°) plus the width of the external stop 7). The outer stop 7 and recess 8 prevent the handle 3 from being turned (and the valve rotating) more than ninety degrees (90°), which is important because it prevents the travel pins 27 from being dislodged from the channel 28 in the guide sleeve 22, 23 that encircles the ball 11 (see FIG. 11).

Figure 2:
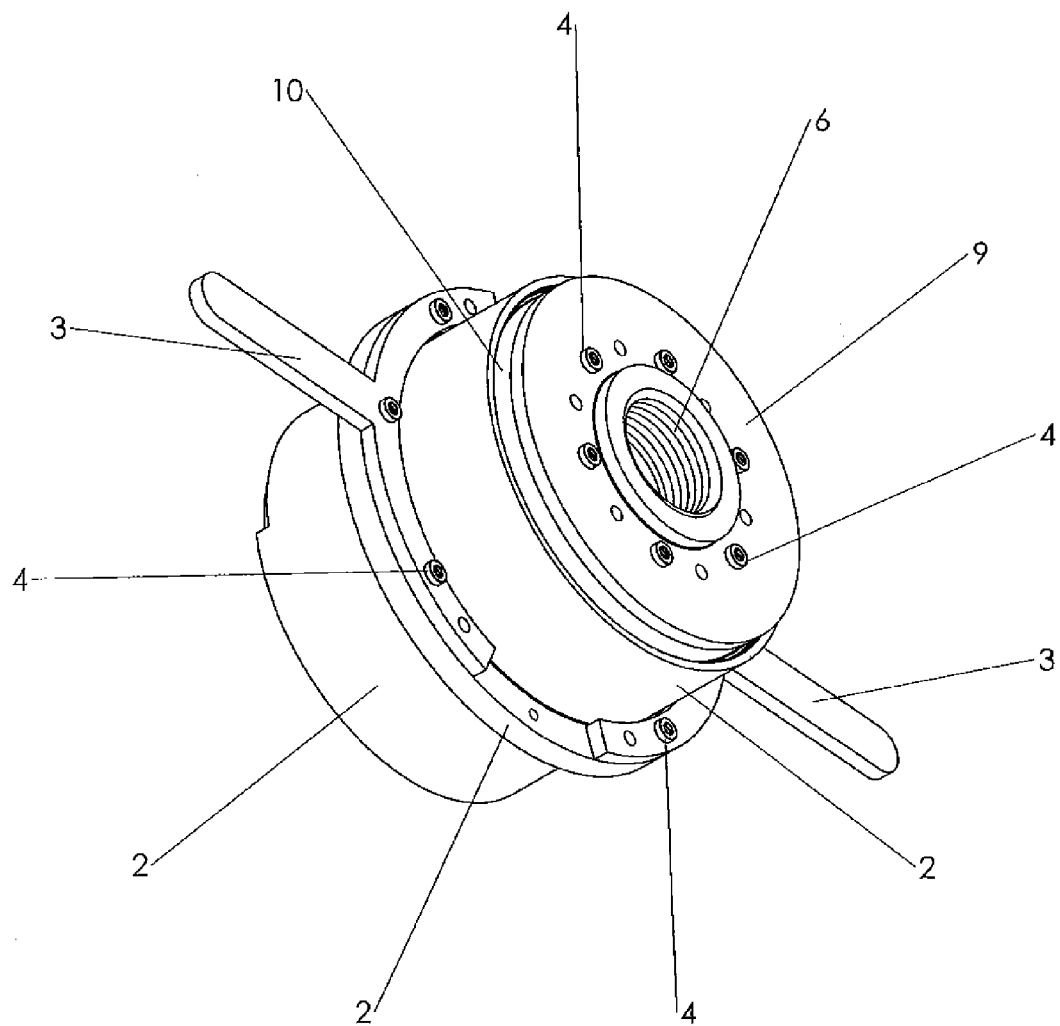
FIG. 2 is a rear perspective view of the present invention fully assembled.

FIG. 2 is a rear perspective view of the present invention fully assembled. This figure shows the second flange 9, the outer housing 2, the handle 3, and the screws 4 that secure the second flange 9 to the inner housing 5 (not shown). A collar 10 lies between the inner housing 5 and the outer housing 2 directly beneath the second flange 9. The second flange 9 also has a threaded aperture 6, which preferably has an inner diameter of 0.5 inches. The threaded apertures 6 in the first and second flanges 1, 9 allow the valve to be hooked up to standard piping.

Figure 3:
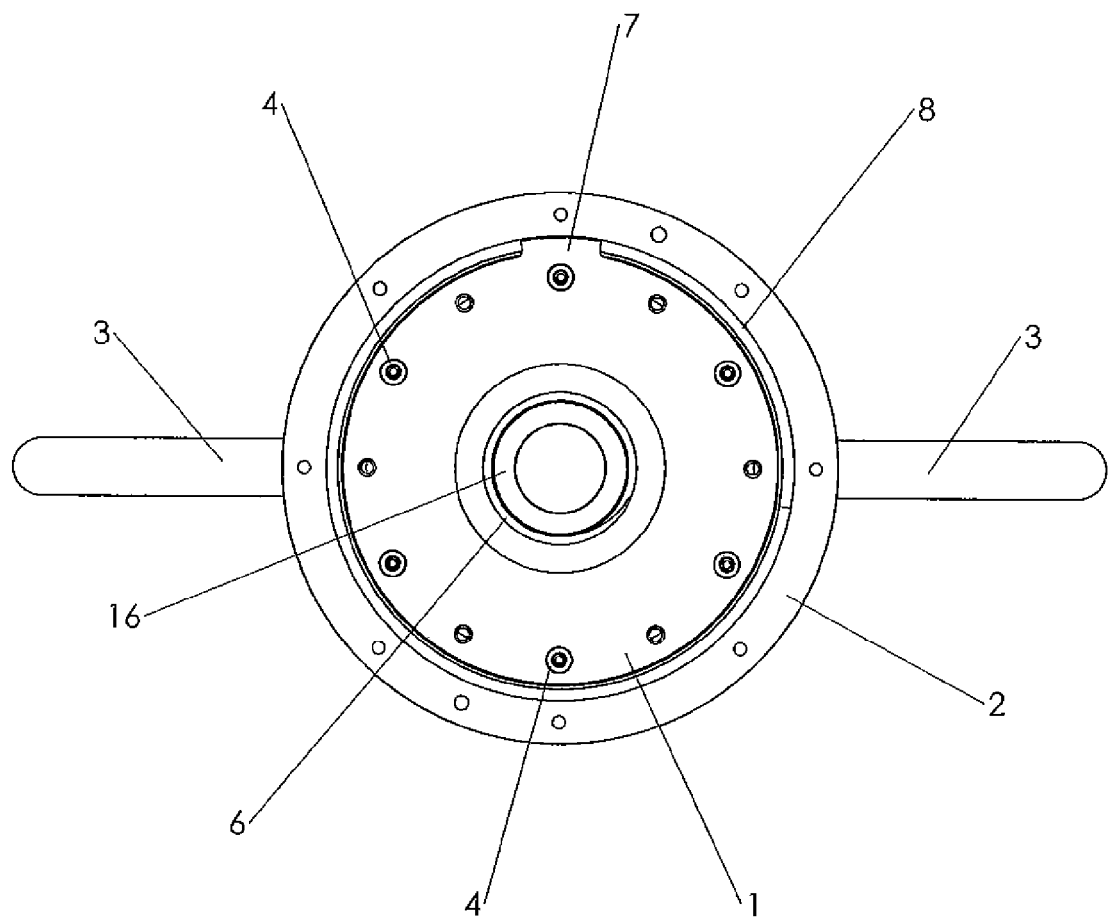
FIG. 3 is a front view of the present invention with the valve fully open.

FIG. 3 is a front view of the present invention with the valve fully open. As shown in subsequent figures, a ball 11 lies between the first and second flanges 1, 9, with a ball seal 12 on either side of the ball 11 (see FIG. 19). Axis pins 13 secure the ball 11 in place inside of an inner magnetic cartridge 14 that lies inside of the inner housing 5 (see FIGS. 10 and 11). When the handle 3 is turned, the inner housing 5 and first and second flanges 1, 9 remain stationary, but the outer housing 2 (which comprises a plurality of magnets) rotates with the handle 3 and causes the inner magnetic cartridge 14 to rotate as well. The inner magnetic cartridge 14 in turn causes the ball 11 to rotate. This mechanism is illustrated more fully in subsequent figures.

Figure 4:
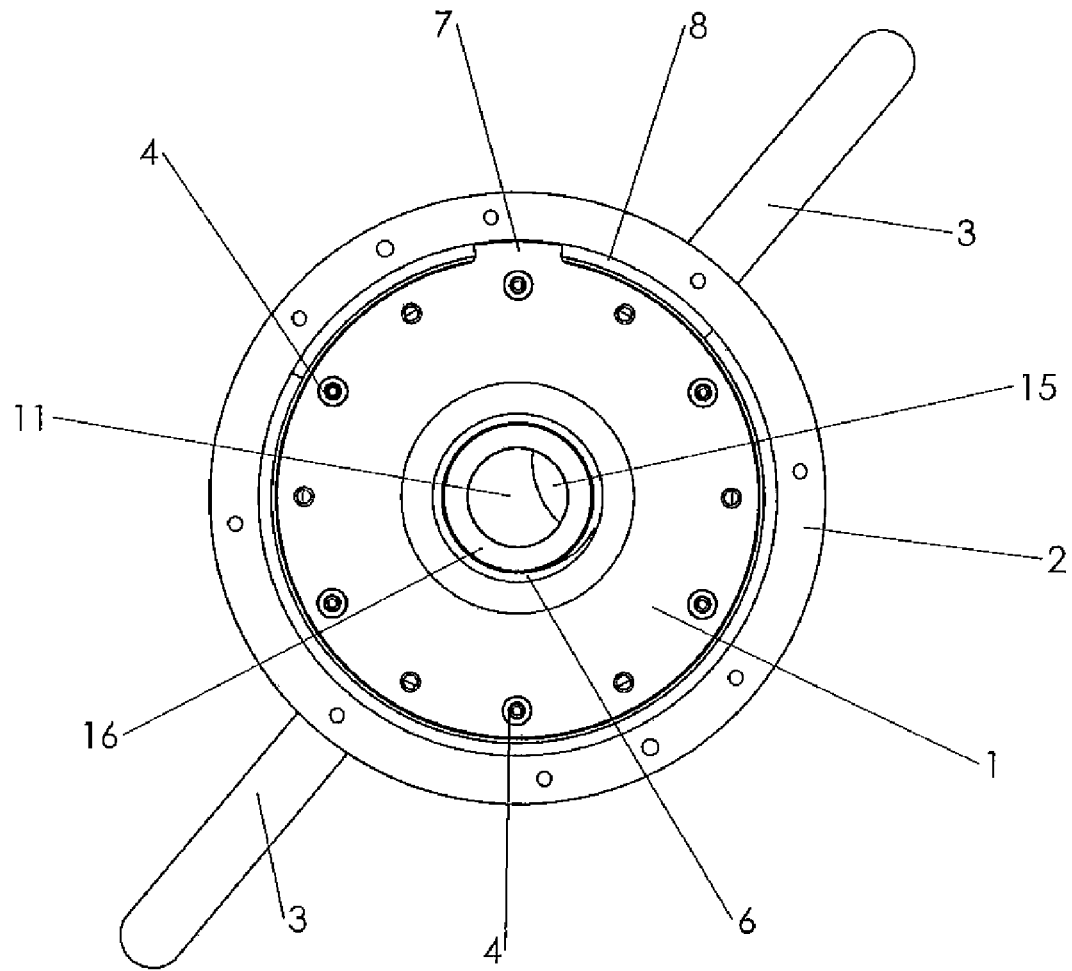
FIG. 4 is a front view of the present invention with the valve partially closed.

FIG. 4 is a front view of the present invention with the valve partially closed. As shown in this figure, the external stop 7 has moved forty-five degrees) (45°) in a clockwise direction in the recess 8 in the outer housing 2. Similarly, the handle 3 has been moved forty-five degrees) (45°) in a clockwise direction. The rotation of the handle 3 causes the ball 11 to rotate, thereby partially closing the valve.

Figure 5:
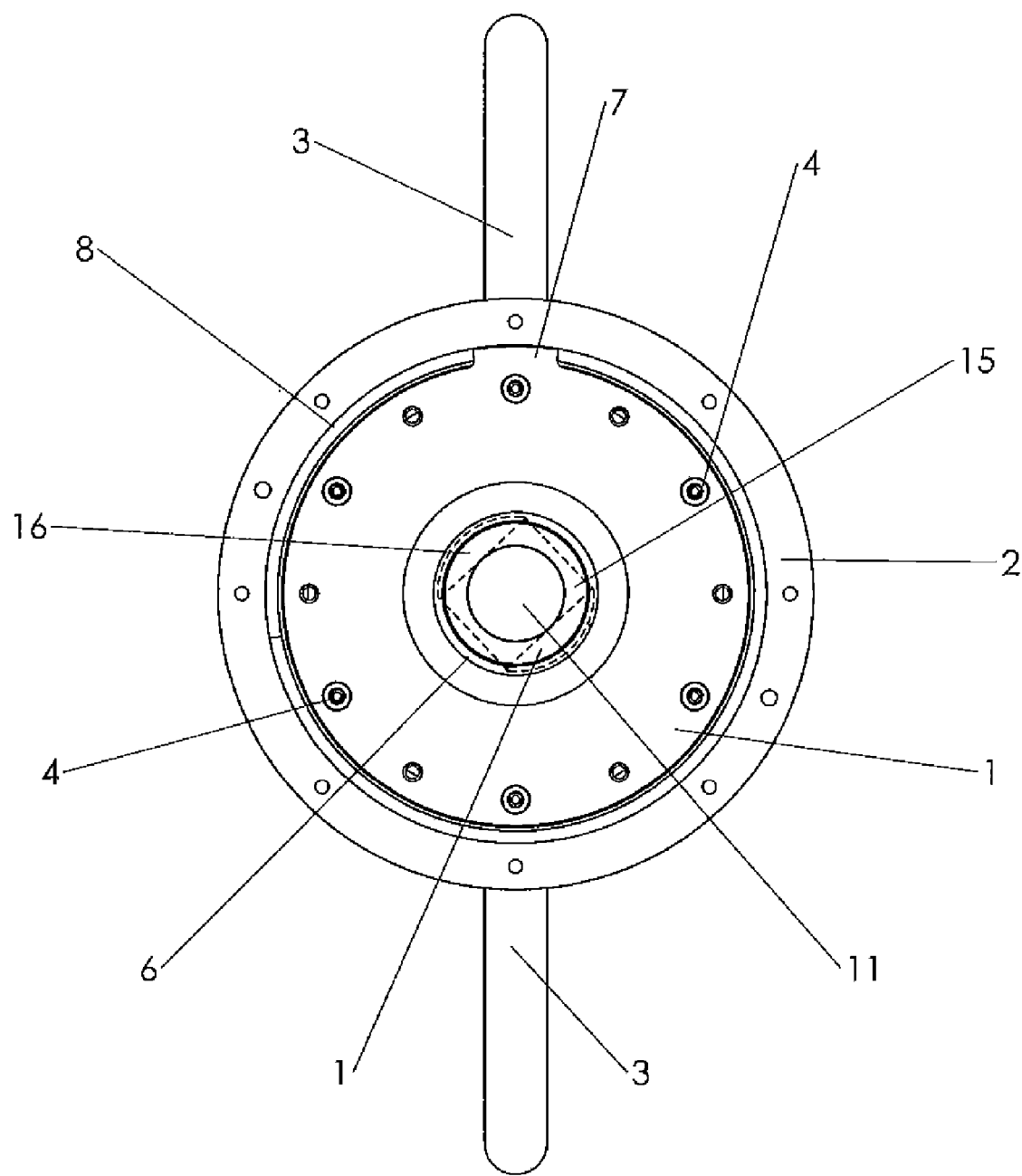
FIG. 5 is a front view of the present invention with the valve fully closed.

FIG. 5 is a front view of the present invention with the valve fully closed. The handle 3 has now rotated ninety degrees) (90°) in a clockwise direction, as has the external stop 7 in the recess 8 in the outer housing 2. Thus, the handle 3 cannot rotate any further in this direction. (Similarly, when rotated in the other direction, the external stop 7 will prevent the handle 3 from being rotated more than ninety degrees (90°)). The valve is now in a closed position, with the ball 11 fully covering the opening between the two flanges. The dotted lines illustrate the perimeter of the ball 1 and the channel 15 in the ball 11. When the valve is open (either fully or partially), fluid is allowed to travel through the channel 15 in the ball 11. When the valve is fully closed, fluid is prevented from passing from one flange to the other by virtue of the fact that the ball 11 is rotated so that the channel 15 is not aligned with the ramps 16 in the flanges (see FIGS. 16 and 17) and also because of the ball seals 12 on either side of the ball 11 (see FIG. 19).

Figure 6:
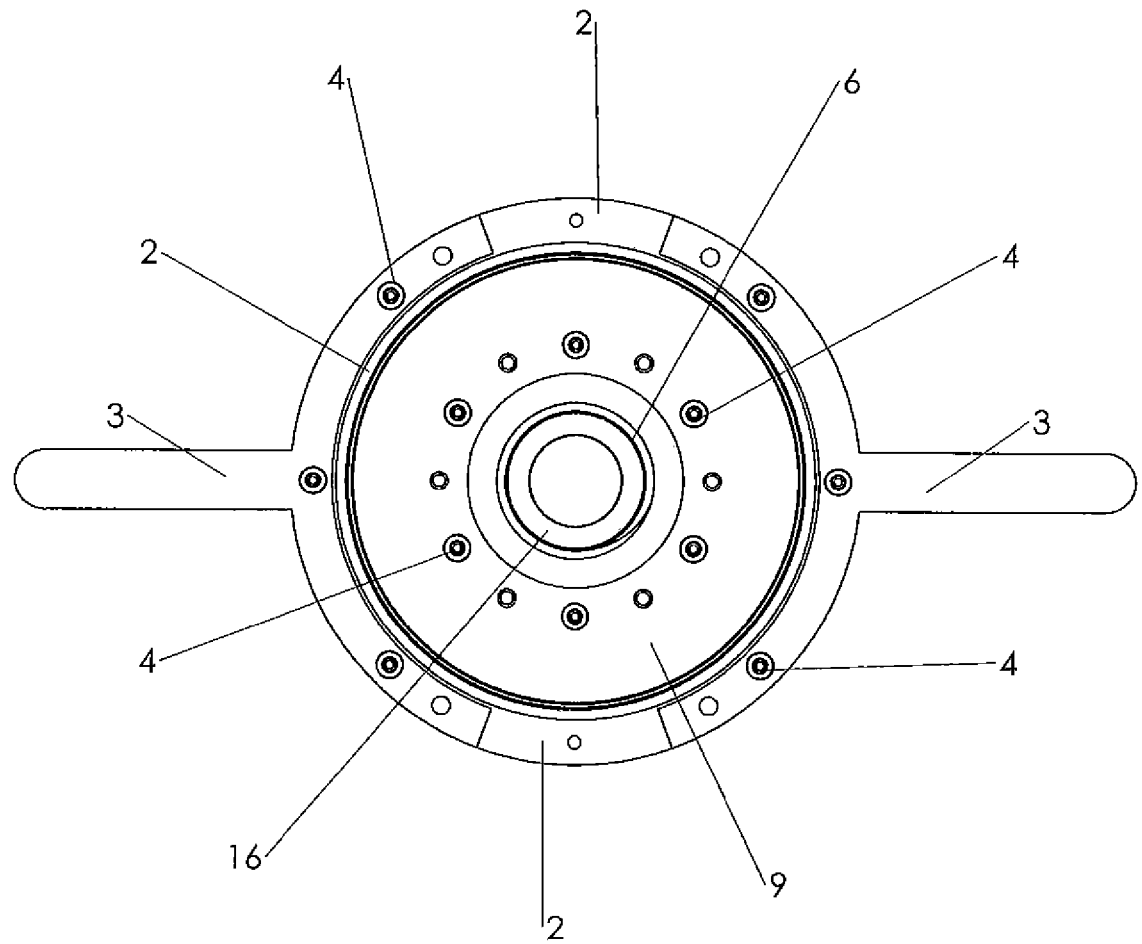
FIG. 6 is a rear view of the present invention with the valve fully open.

FIG. 6 is a rear view of the present invention with the valve fully open. In this figure, the valve is in the same position as shown in FIG. 3.

Figure 7:
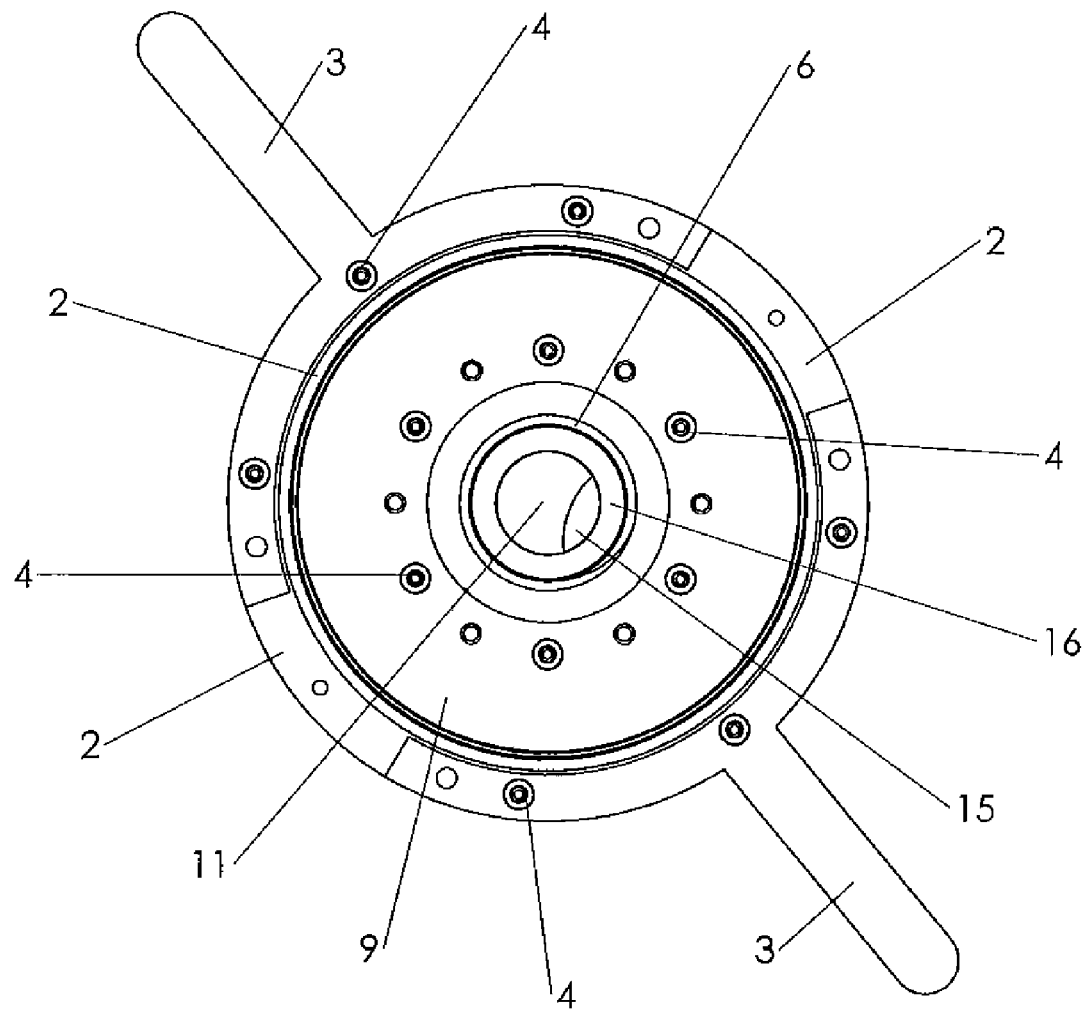
FIG. 7 is a rear view of the present invention with the valve partially closed.

FIG. 7 is a rear view of the present invention with the valve partially closed. In this figure, the valve is in the same position as shown in FIG. 4.

Figure 8:
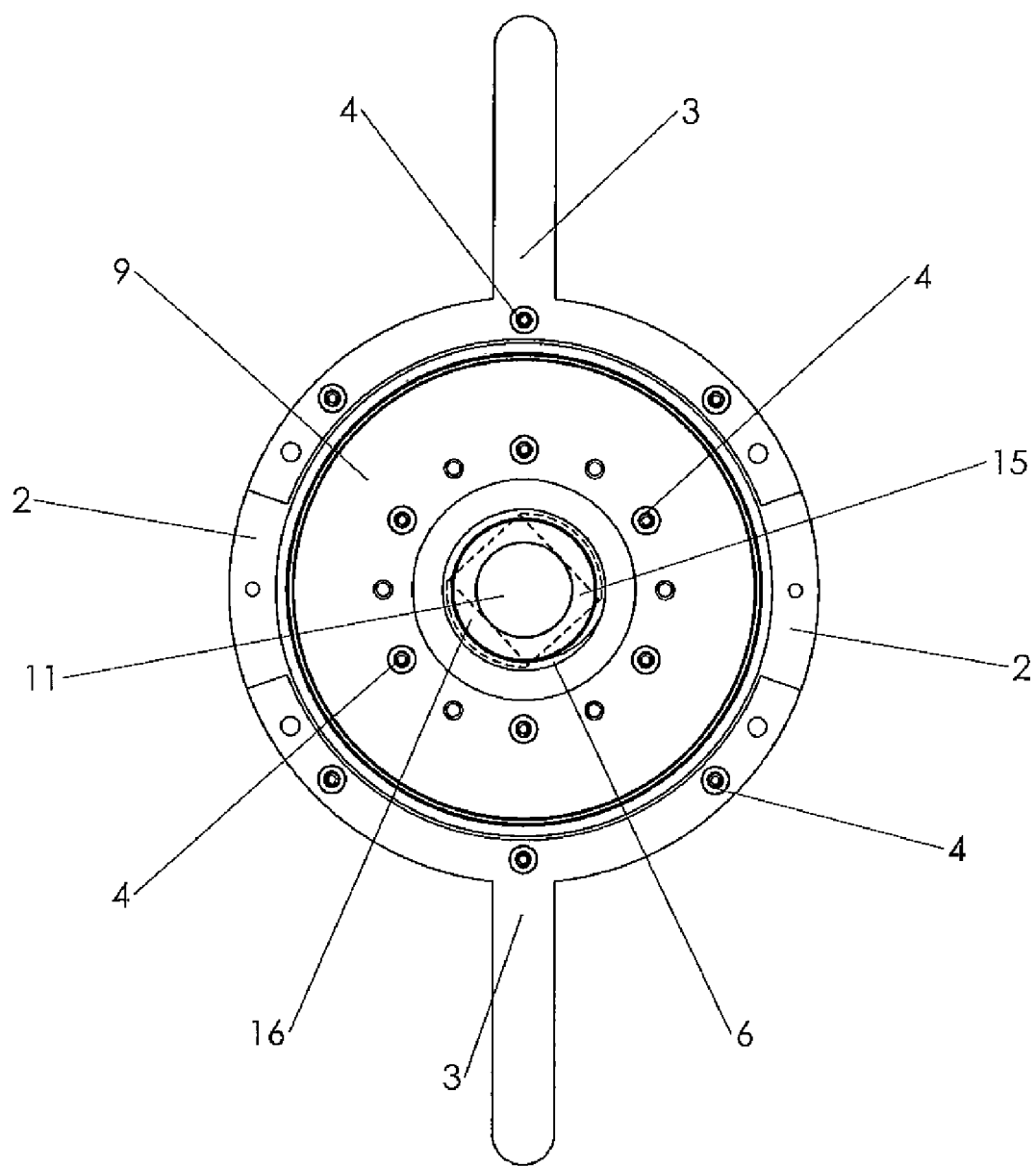
FIG. 8 is a rear view of the present invention with the valve fully closed.

FIG. 8 is a rear view of the present invention with the valve fully closed. In this figure, the valve is in the same position as shown in FIG. 5.

Figure 9:
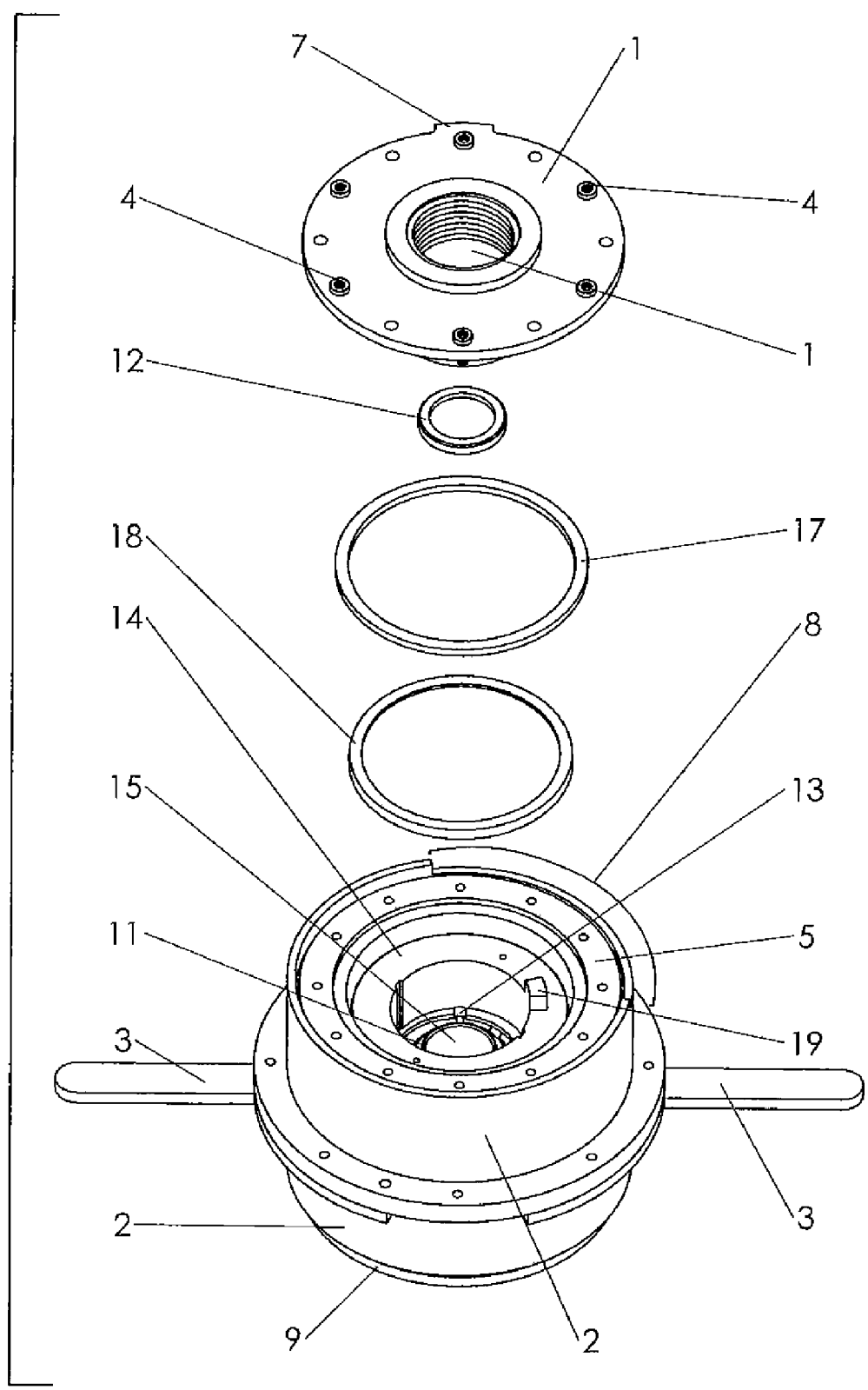
FIG. 9 is an exploded view of the present invention with the first flange and first and second journal bearings removed.

FIG. 9 is an exploded view of the present invention with the first flange and first and second journal bearings removed. In this particular embodiment, the first journal bearing 17 lies between the inner housing 5 and the first flange 1, and the second journal bearing 18 lies between the inner magnetic cartridge 14 and the first flange 1; however, the present invention is not limited to any particular number or configuration of journal bearings. Journal bearings are used as necessary to alleviate friction between the various moving parts.

Figure 32:
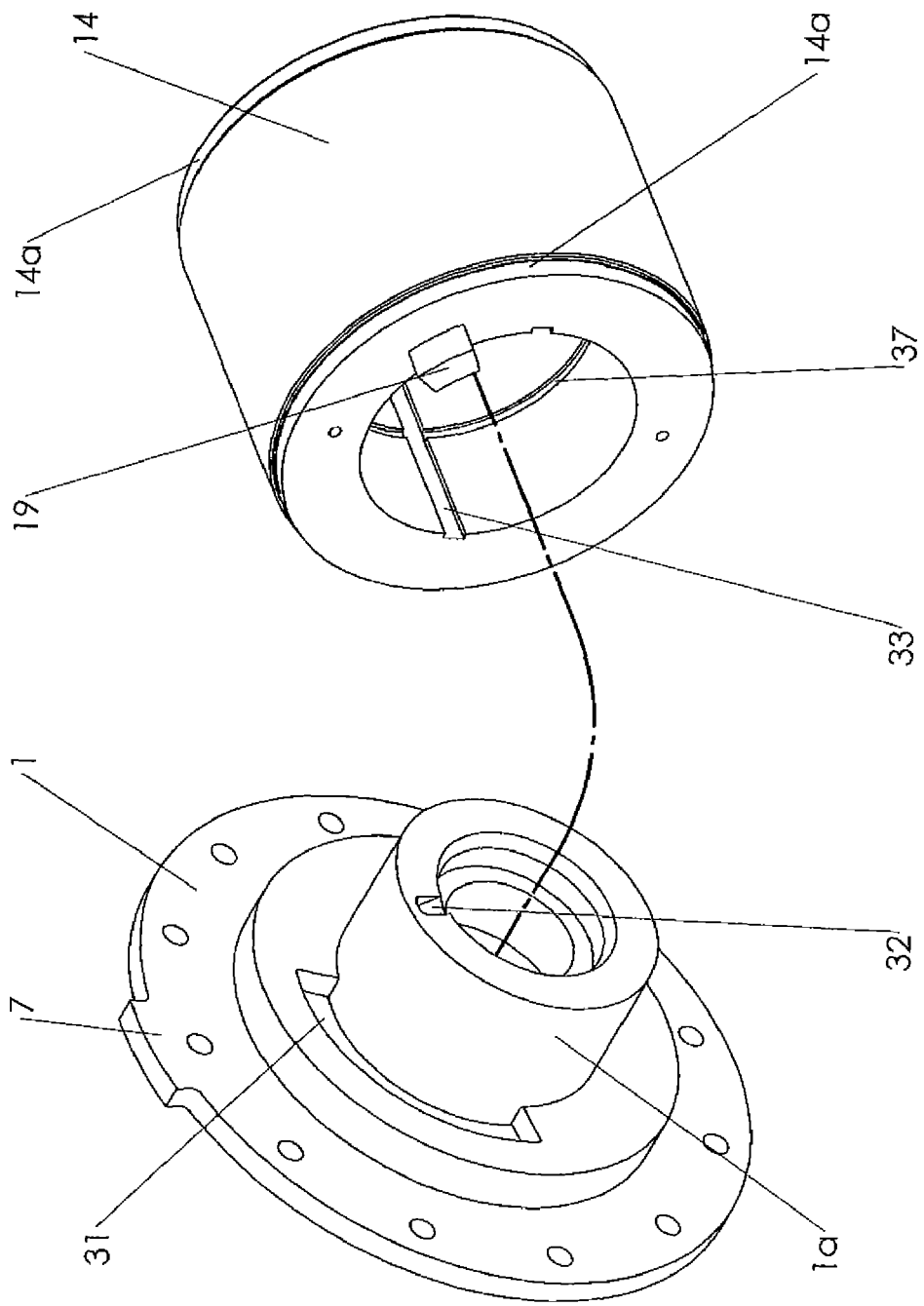
FIG. 32 is a perspective view of the first flange and inner magnetic cartridge of the present invention.

FIG. 9 shows the internal stop 19 located on the removable magnetic cartridge 14. The mechanism of the internal stop 19 is illustrated in FIG. 32. FIG. 9 also shows one of the two axis pins 13 about which the ball 11 rotates. It also shows one of the two ball seals 12 on either side of the ball 11 (see FIGS. 16 and 17 for the positioning of the ball seals 12 inside of the flanges 1, 9).

Figure 10:
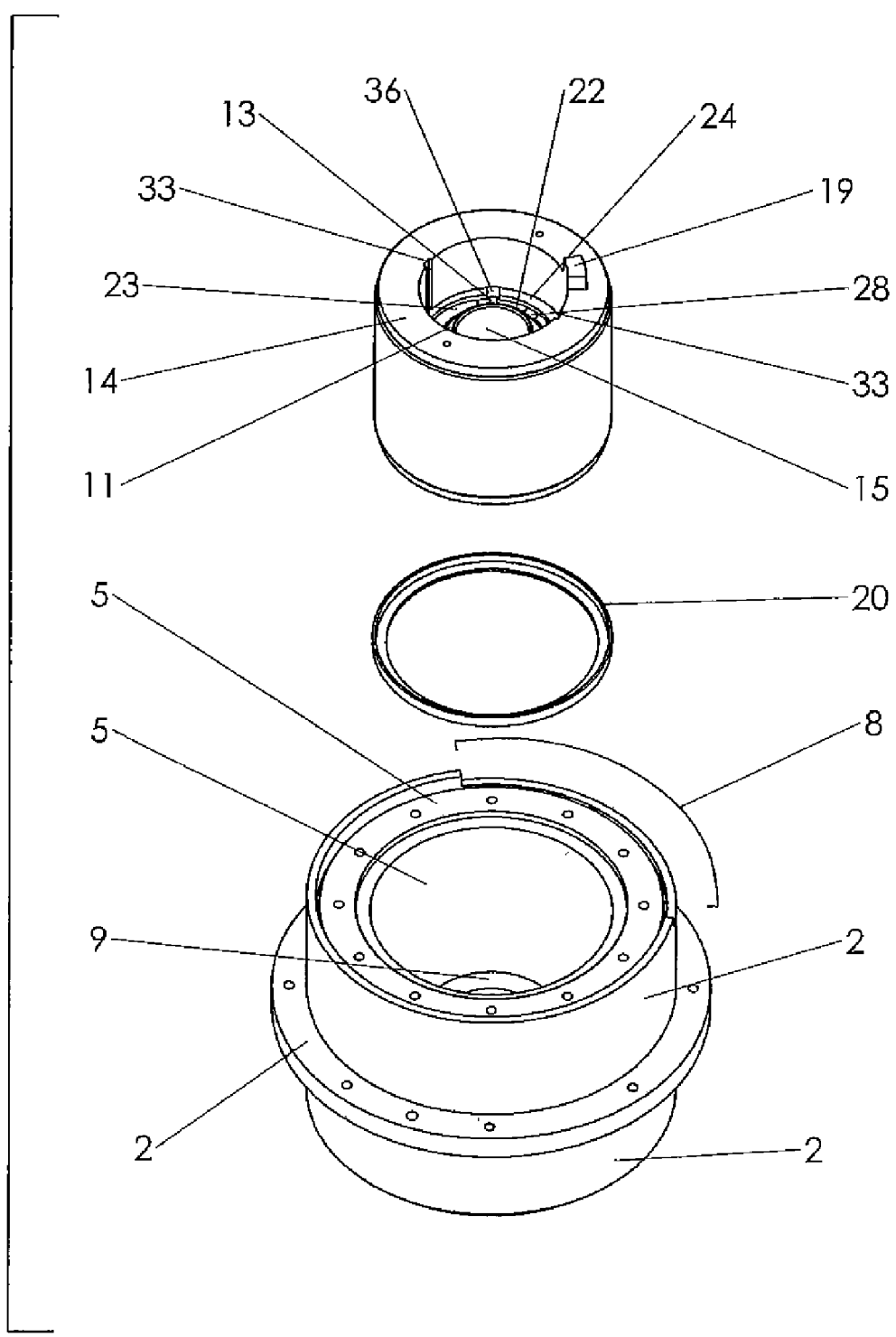
FIG. 10 is an exploded view of the present invention with the inner magnetic cartridge, third journal bearing, handle and second flange 9 removed.

FIG. 10 is an exploded view of the present invention with the inner magnetic cartridge and third journal bearing removed. In this embodiment, the third journal bearing 20 lies between the inner housing 5 and the inner magnetic cartridge 14. As stated above, the present invention is not limited to any particular number or configuration of journal bearings. In this figure, the handle 3, collar 10, fifth journal bearing 30 and second flange 9 have also been removed; these parts are shown in FIG. 13.

Figure 11:
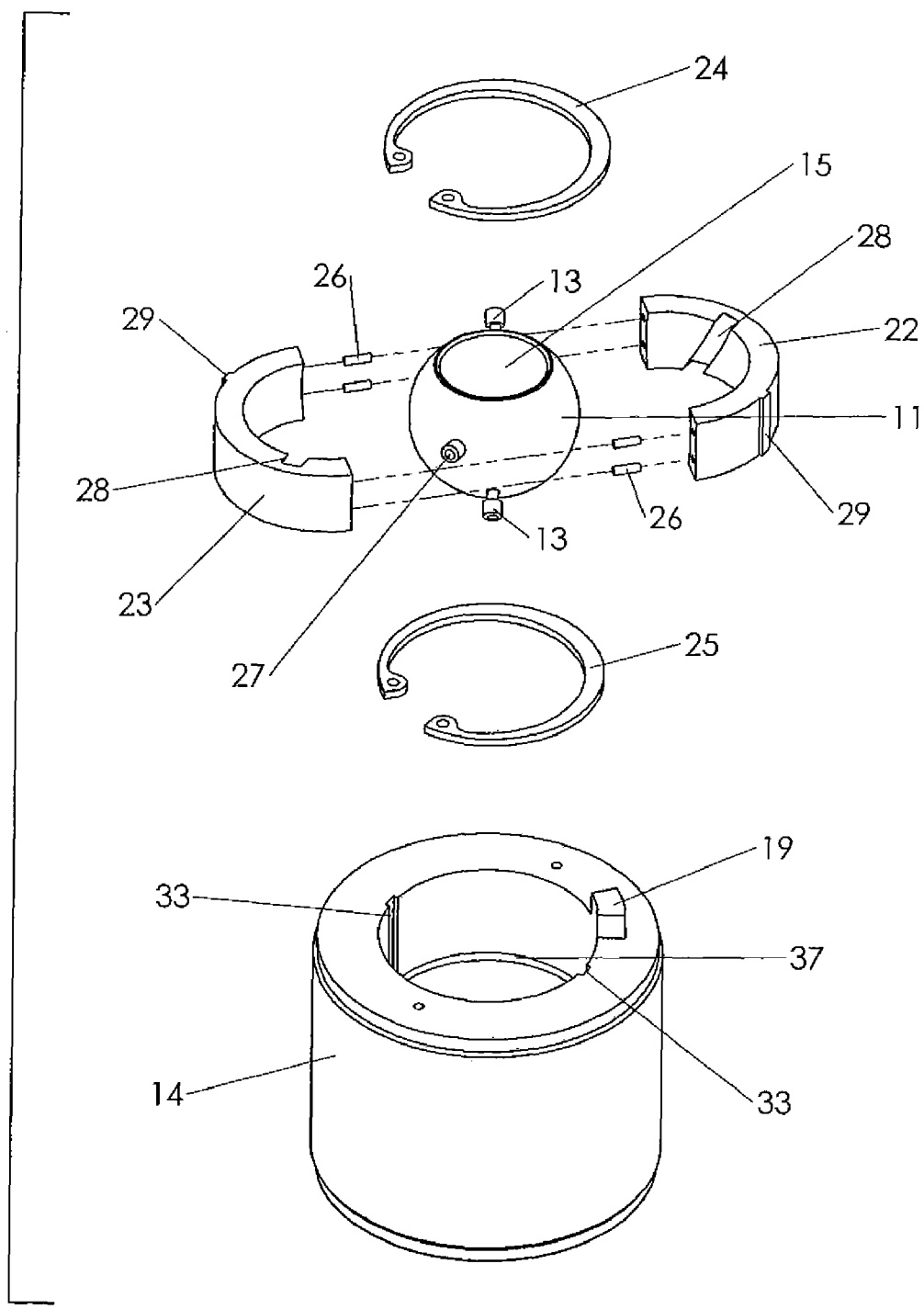
FIG. 11 is an exploded view of the inner magnetic cartridge and guide cartridge assembly of the present invention.

FIG. 11 is an exploded view of the inner magnetic cartridge and guide cartridge assembly of the present invention. (This figure is an exploded view of the top part of FIG. 10.) The guide cartridge assembly comprises a first half of the guide sleeve 22, a second half of the guide sleeve 23, a first internal retaining ring 24, and a second internal retaining ring 25. The two halves of the guide sleeve are joined together with pins 26. This figure also shows the two travel pins 27, which extend from the ball 11 and travel within channels 28 in the first and second halves of the guide sleeves 22, 23 when the valve is rotated (i.e., when the handle 3 is turned, thereby causing the inner magnetic cartridge 14 to rotate). The two axis pins 13 on the ball 11 are situated within notches in the first and second flanges 1, 9 (see FIGS. 14 and 15) such that the axis pins are allowed to rotate within the notches. The first and second halves of the guide sleeve 22, 23 each comprises an external appendage 29, which fits inside of a longitudinal recess 33 on either side of the inside of the inner magnetic cartridge 14, thereby holding the guide sleeve stationary with respect to the inner magnetic cartridge 14 and causing it to move in sync with the inner magnetic cartridge 14. When the guide sleeve moves in a clockwise or counterclockwise direction, the travel pins 27 move up or down within the channels 28 in the guide sleeve, thereby causing the ball to rotate, which in turn opens and closes the valve. In a preferred embodiment, the angle of the channels 28 in the guide sleeve is such that they allow the valve (handle) to rotate a full ninety degrees) (90°) and the travel pins 27 to move with the direction of the channel 28 in the guide sleeve (i.e., the angle of the channel 28 facilitates the mechanical movement of the travel pin 27 within the channel 28). The inner magnetic cartridge 14 preferably comprises two circular recesses 37 into which the internal retaining rings 24, 25 are positioned. The purpose of the internal retaining rings 24, 25 is to prevent the guide sleeve 22, 23 from moving up or down (longitudinally) within the inner magnetic cartridge 14 (see FIG. 18).

Figure 12:
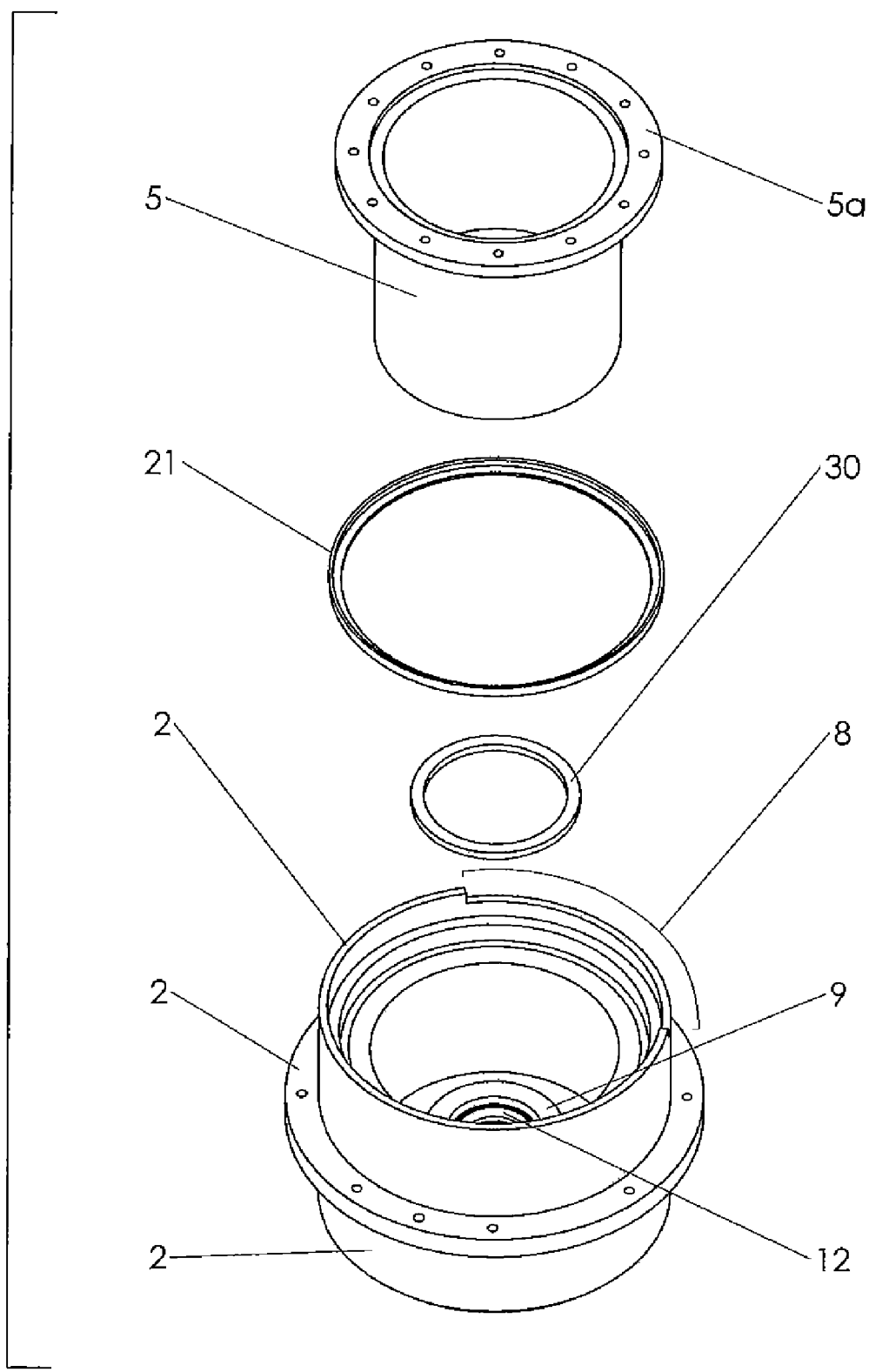
FIG. 12 is an exploded view of the inner housing, fourth and fifth journal bearings, and outer housing of the present invention.
Figure 15:
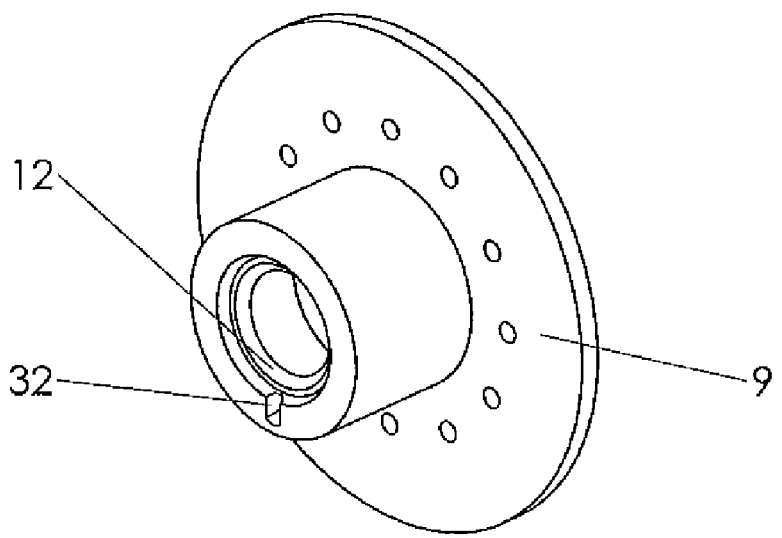
FIG. 15 is a perspective view of the second flange of the present invention.
Figure 16:
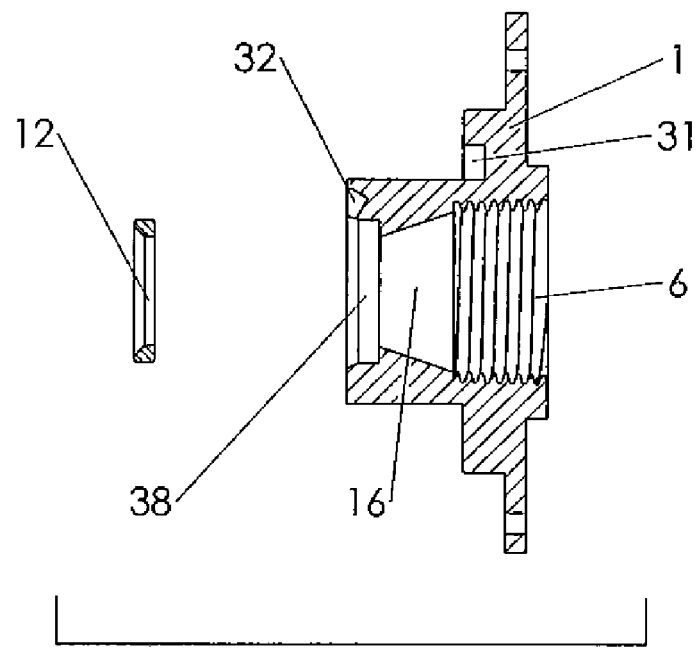
FIG. 16 is a section view of the first flange and one of the two ball seals of the present invention.
Figure 17:
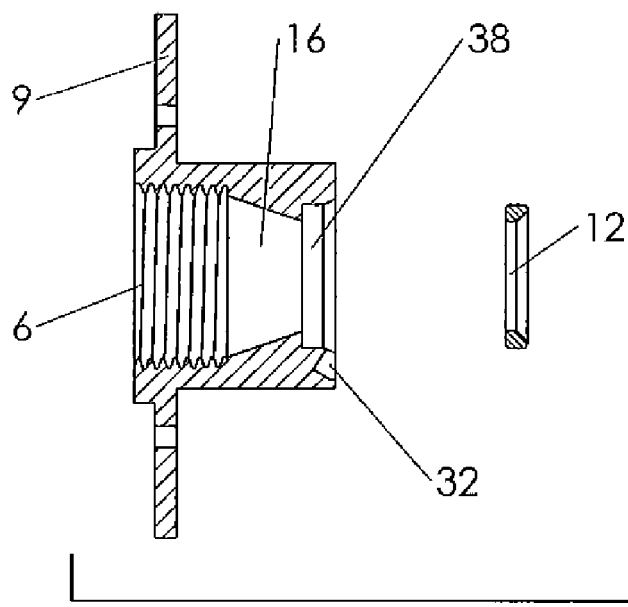
FIG. 17 is a section view of the second flange and one of the two ball seals of the present invention.

FIG. 12 is an exploded view of the inner housing, fourth and fifth journal bearings, and outer housing of the present invention. (This figure is an exploded view of the bottom part of FIG. 10.) The fourth bearing journal 21 preferably lies underneath the lip 5a of the inner housing, between the inner housing 5 and the outer housing 2. The fifth journal bearing 30 lies between the inner housing 5 and the flange 9. In a preferred embodiment, there is a ball seal 12 on either side of the ball 11 (see FIGS. 14 and 15). As shown in FIGS. 16 and 17, the ball seals 12 lie within a recess 38 in the first and second flanges 1, 9.

Figure 13:
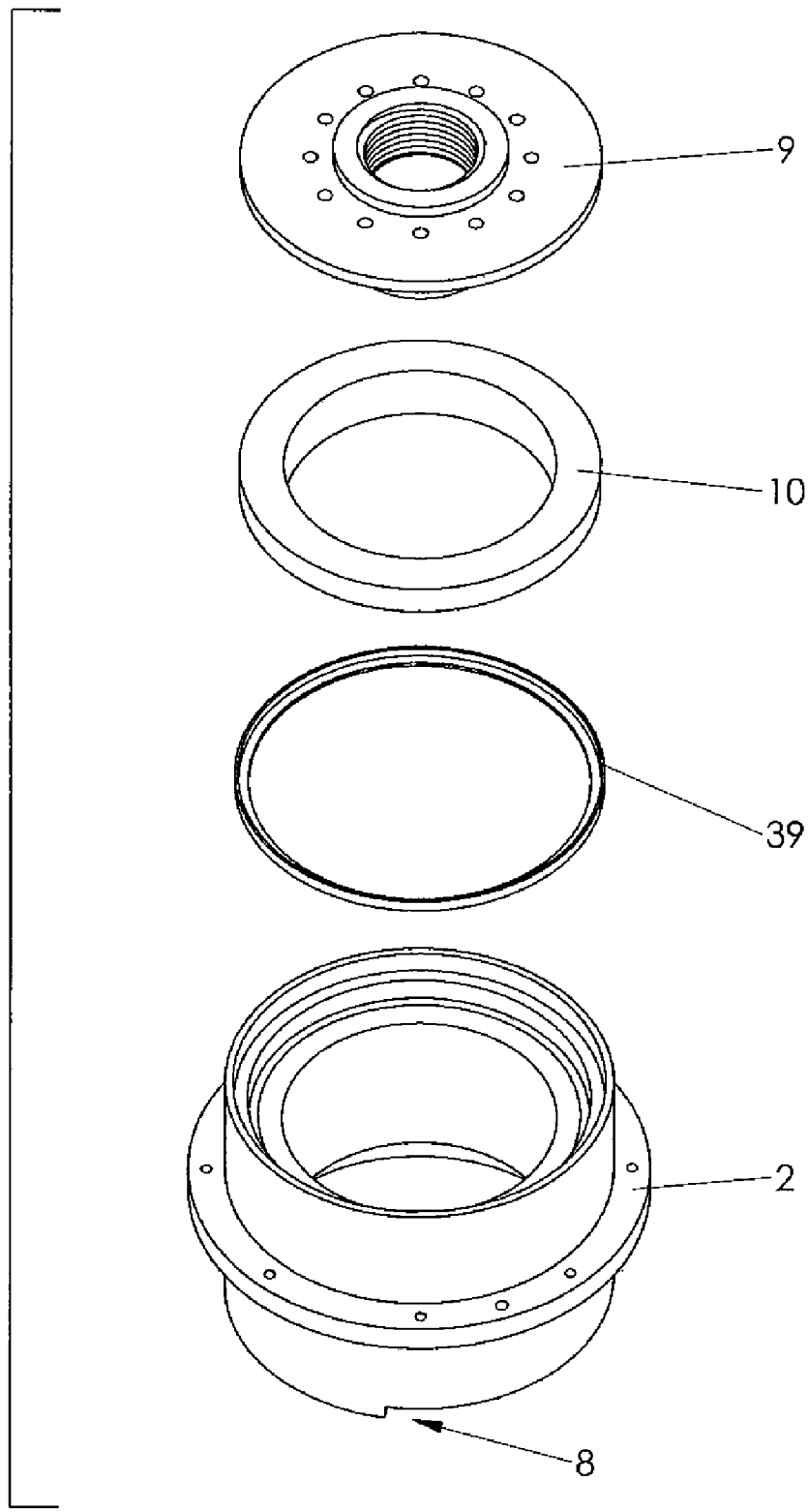
FIG. 13 is an exploded view of the present invention with the second flange, collar and sixth journal bearing removed.

FIG. 13 is an exploded view of the present invention with the second flange, collar and sixth journal bearing removed. The sixth journal bearing 39 preferably lies between the collar 10 and the outer housing 2.

Figure 24:
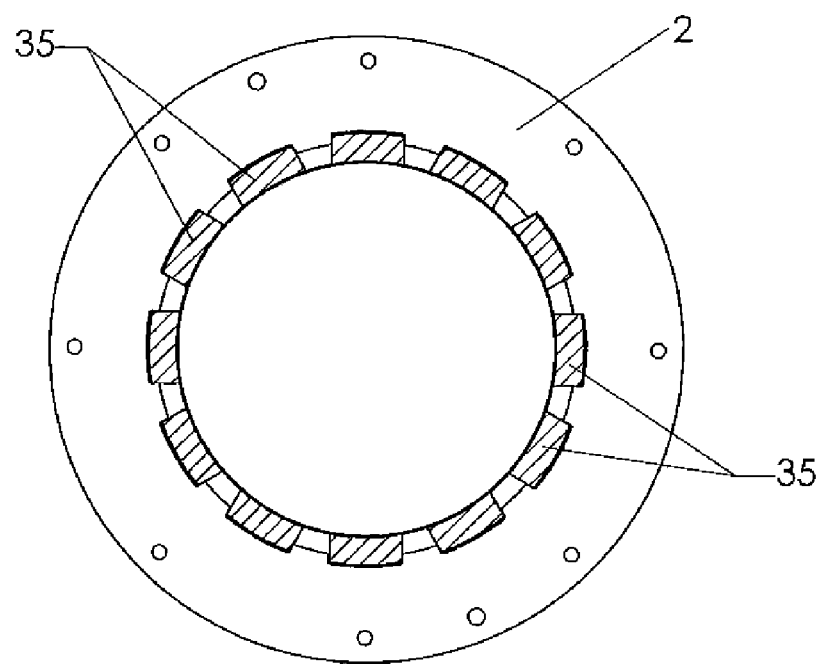
FIG. 24 is a section view of the outer housing showing the outer magnets.
Figure 25:
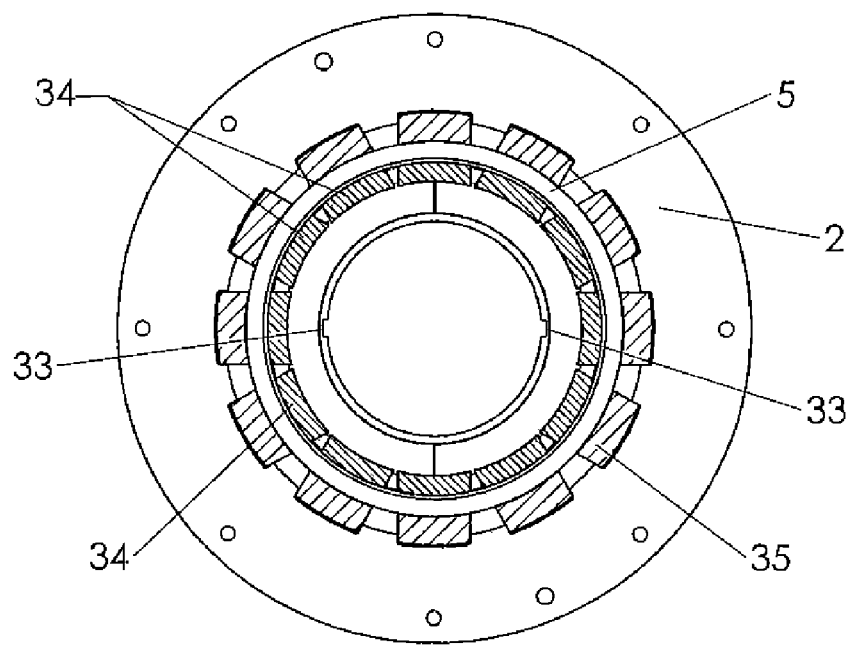
FIG. 25 is a section view of the inner magnetic cartridge inside the outer housing showing the alignment of the inner and outer magnets.

The outer housing 2, inner housing 5 and flanges 1, 9 shown in FIGS. 1-13 are not limited to the particular shapes shown in these figures. For example, although the first and second flanges 1, 9 are shown as asymmetrical (i.e., they are not the same), they could be symmetrical (i.e., identical). For purposes of the present invention, all that matters is that each flange 1, 9 has a ramp 16 (see FIGS. 16 and 17), the ball 1 is situated between the two ramps 16, a ball seal lies on either side of the ball 11, and each axis pin 13 is fixed in one of the two flanges 1, 9. Similarly, there must be a guide sleeve 22, 23 that is attached to the inner magnetic cartridge 14 and that comprises a channel 28 in which the two travel pins 27 move (up and down) as the handle 3 is rotated. There must be an inner and outer magnetic cartridge 14, 2 (as shown in FIGS. 24 and 25, the outer magnetic cartridge is part of the outer housing), the handle 3 being attached to the outer magnetic cartridge, that cause the guide sleeve 22, 23 to move when the handle 3 moves, thereby causing the travel pins 27 to move up or down within the channels 28 in the guide sleeve 22, 23 and the ball 11 to rotate. The particular shape or configuration of the two flanges 1, 9 (as long as they each have a ramp 16 and a threaded aperture 6 for attachment to piping), the shape of the inner housing 5 (as long as it lies between the inner and outer magnetic cartridges and is fixedly attached to both of the flanges 1, 9), and whether or not there is a collar 10, are all irrelevant. Similarly, the shape of the outer housing 2 is irrelevant as long it contains the outer magnetic cartridge (see FIGS. 24 and 25) and can be attached to the handle 3.

Figure 14:
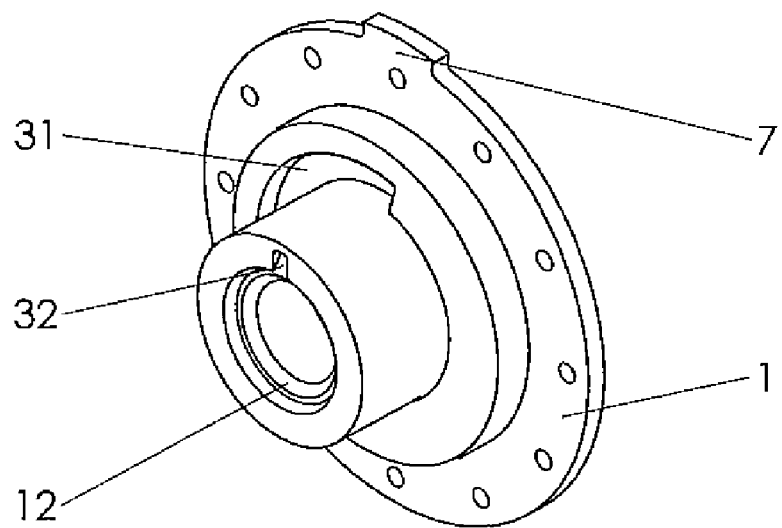
FIG. 14 is a perspective view of the first flange of the present invention.

FIG. 14 is a perspective view of the first flange of the present invention. As noted above, the first flange 1 preferably comprises an external stop 7. It also comprises an internal recess 31, the purpose of which is illustrated in FIG. 32. FIG. 14 also shows the notch 32 into which one of the two axis pins 13 is inserted. The other axis pin is inserted into a notch in the second flange 9 (see FIG. 15). The ball seals 12 are shown inside the recesses 38 in the first and second flanges 1, 9 (see FIGS. 16 and 17 to see the recesses in the flanges).

FIG. 16 is a section view of the first flange and one of the two ball seals of the present invention. As shown in this figure, the first flange 1 comprises a ramp 16 that leads from the threaded aperture 6 to the ball 11 (not shown). Although shown as slightly tapered, the ramp does not necessarily need to be tapered; it simply serves as a conduit from the threaded aperture 6 to the ball 11. The inner end of the flange 1 preferably comprises a recess 38 into which the ball seal 12 fits.

FIG. 17 is a section view of the second flange and one of the two ball seals of the present invention. Like the first flange 1, the second flange 9 comprises a ramp 16 that leads from the threaded aperture 6 to the ball 11 (not shown). Although shown as slightly tapered, the ramp does not necessarily need to be tapered; it simply serves as a conduit from the threaded aperture 6 to the ball 11. The inner end of the flange 9 preferably comprises a recess 38 into which the ball seal 12 fits. The ball 11 (not shown) is situated between the two ball seals 12, with the axis pins 13 lodged into the notches 32 in each of the two flanges 1, 9.

Figure 18:
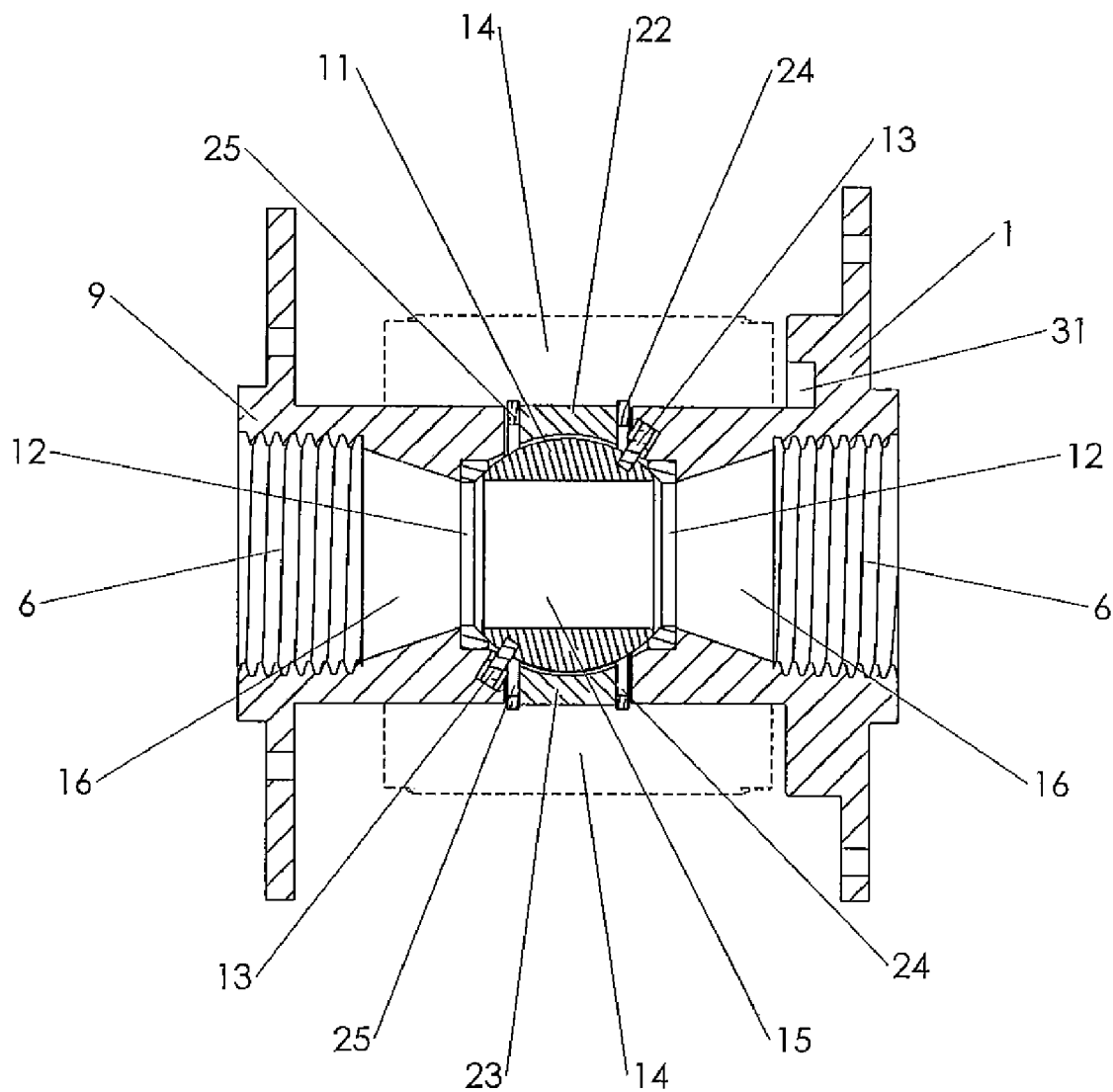
FIG. 18 is a section view of the first and second flanges, ball, and guide cartridge assembly of the present invention.

FIG. 18 is a section view of the first and second flanges, ball, and guide cartridge assembly of the present invention. As noted above, the guide cartridge assembly comprises the first and second halves of the guide sleeve 22, 23 and the first and second internal retaining rings 24, 25. As shown in this figure, there is preferably a slight gap between the first flange 1 and first internal retaining ring 24 and between the second flange 9 and second internal retaining ring 25. The reason for this slight gap is so that pressure is retained between the ball 11 and ball seals 12 on either side, thereby allowing the ball seals 12 to create a seal on either side of the ball 11. (Note that the first and second internal retaining rings 24, 25 are shown partially with hatched lines and partially without hatched lines because only a portion of the internal retaining rings is shown in cross section, as represented by the hatched lines.)

The position of the inner magnetic cartridge 14 in relation to the other parts shown in this figure is indicated with dotted lines.

Figure 19:
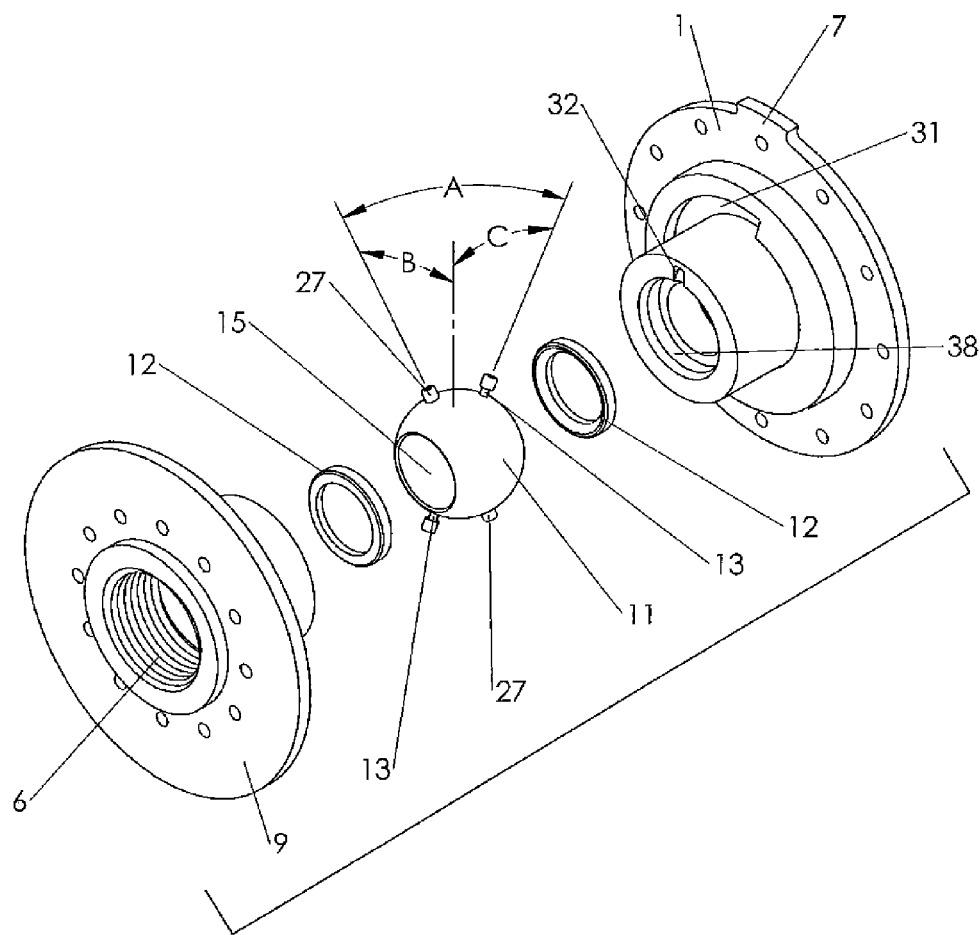
FIG. 19 is an exploded view of the ball, ball seals, and first and second flanges of the present invention.

FIG. 19 is an exploded view of the ball, ball seals, and first and second flanges of the present invention. This figure clearly shows the orientation of the ball 11 and ball seals 12 in relation to the first and second flanges 1, 9. The guide cartridge assembly is not shown. In a preferred embodiment, the angle between the axis pins 13 and the travel pins 27 is forty-eight (48) degrees, as indicated by angle "A" in FIG. 19, and the travel pins 27 are twenty-five (25) degrees out of plane with the axis pins 13 and channel 15 in the ball 1, as indicated by angle "B" in FIG. 19. Angle "C" represents the angle between one of the axis pins and the center of the channel 15. In this embodiment, angle "C" is thirty-two (32) degrees, which means that each axis pin is thirty-two (32) degrees from the center of the channel 15 on one side of the ball and one hundred forty-eight (148) degrees from the center of the channel 15 on the other side of the ball.

Figure 20:
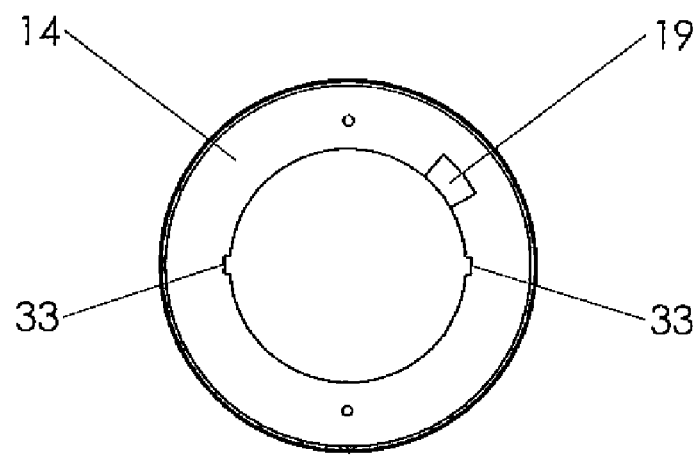
FIG. 20 is a front view of the inner magnetic cartridge of the present invention.

FIG. 20 is a front view of the inner magnetic cartridge of the present invention. This figure shows the two longitudinal channels 33 in the inside of the inner magnetic cartridge 14, which hold the guide sleeve 22, 23 in place inside of the inner magnetic cartridge 14. It also shows the inner stop 19 that protrudes from one end of the inner magnetic cartridge 14. The purpose of the internal stop 19 is illustrated in FIG. 32.

Figure 21:
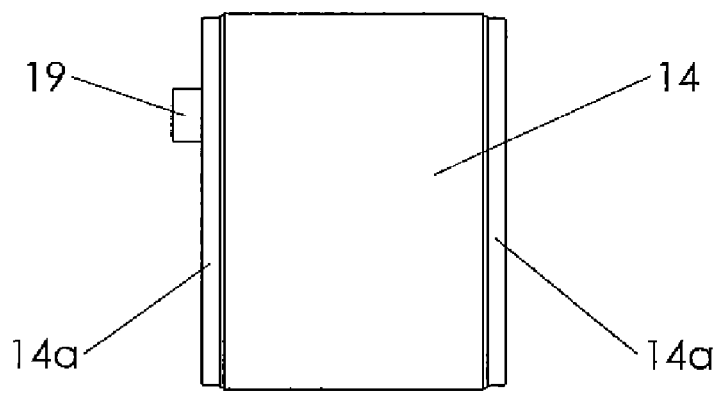
FIG. 21 is a side view of the inner magnetic cartridge of the present invention.
Figure 22:
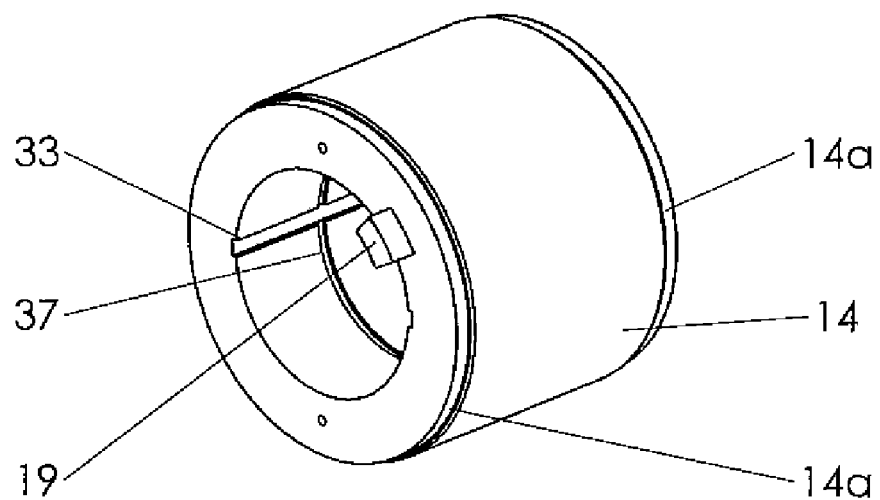
FIG. 22 is a perspective view of the inner magnetic cartridge of the present invention.

FIG. 21 is a side view of the inner magnetic cartridge of the present invention. The recesses 14*a* around the perimeter of either end of the inner magnetic cartridge 14 are for holding journal bearings 18, 20. FIG. 22 is a perspective view of the inner magnetic cartridge showing the same parts described in relation to FIGS. 20 and 21.

Figure 23:
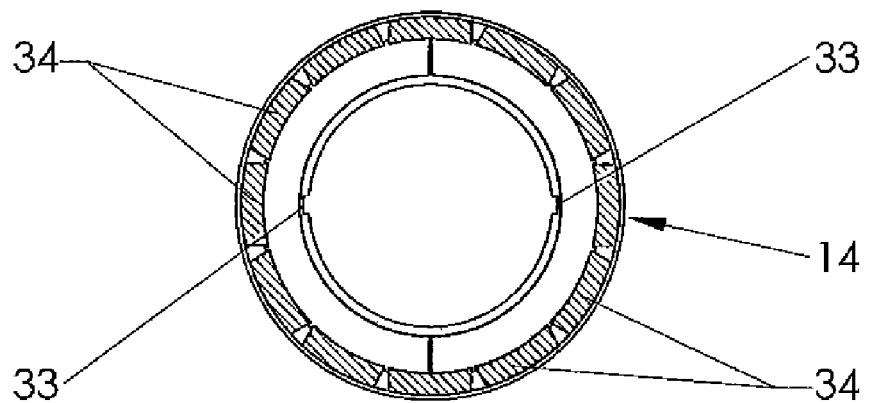
FIG. 23 is a section view of the inner magnetic cartridge showing the inner magnets.

FIG. 23 is a section view of the inner magnetic cartridge showing the inner magnets. The inner magnets 34 extend longitudinally (parallel with the longitudinal channels 33) from one end of the inner magnetic cartridge 14 to the other, with the inner magnets aligned parallel to one another around the perimeter of the inner magnetic cartridge 14.

FIG. 24 is a section view of the outer housing showing the outer magnets (i.e., the outer magnetic cartridge). The outer magnets 35 extend longitudinally from one end of the outer housing 2 to the other, with the outer magnets aligned parallel to one another around the inside diameter of the outer housing 2. As shown in FIG. 25, when the inner magnetic cartridge is positioned inside of the inner housing 5 and the inner housing 5 positioned inside of the outer housing 2, the inner and outer magnets line up with one another in cross section, thereby creating a strong magnetic force between the outer housing 2 and the inner magnetic cartridge 14.

Figure 26:
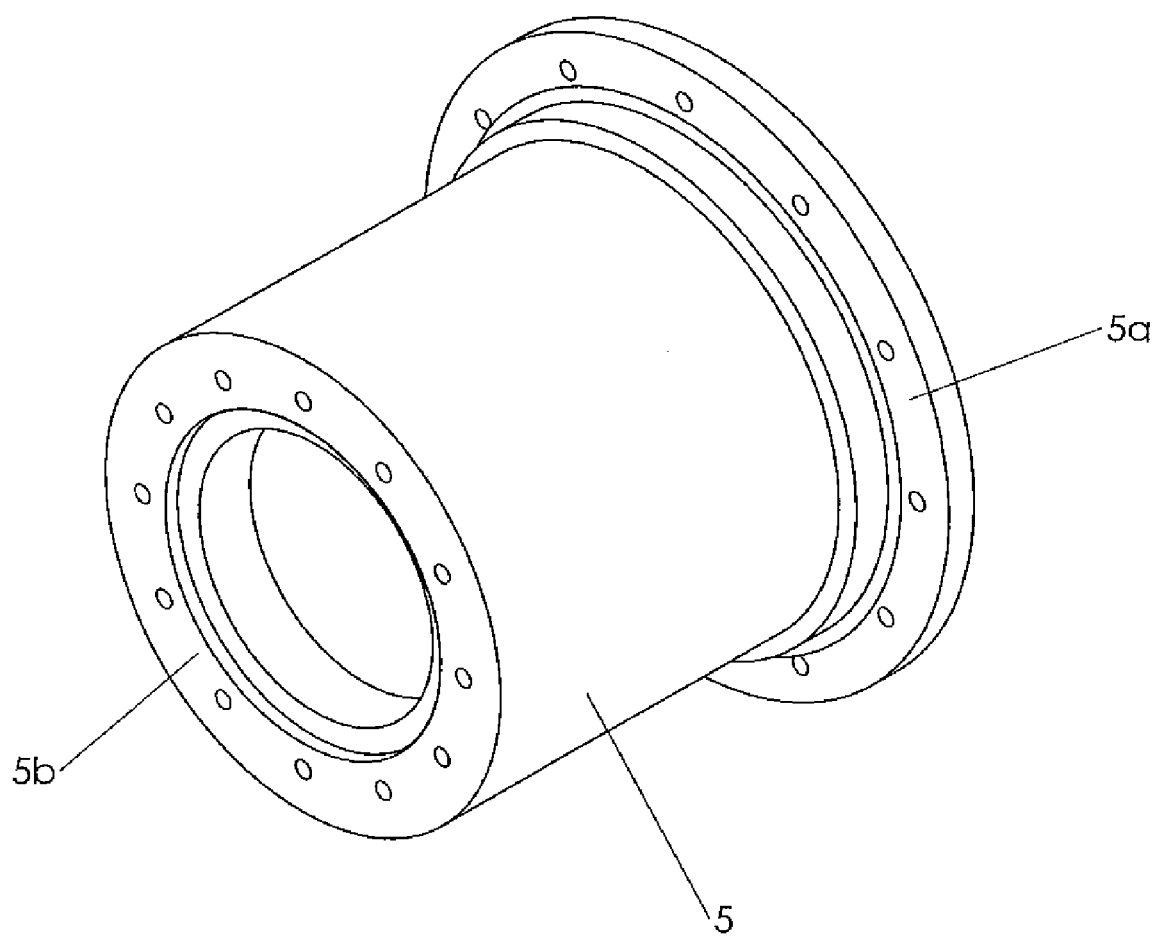
FIG. 26 is a perspective view of the inner housing of the present invention.

FIG. 26 is a perspective view of the inner housing of the present invention. In this particular embodiment, the first flange 1 attaches to the lip 5*a* of the inner housing 5 with screws 4 (not shown), and the second flange 9 attaches to the bottom 5*b* of the inner housing 5 with screws 4 (not shown). The purpose of the inner housing is to provide a stationary surface to which the first and second flanges 1, 9 are attached. Thus, the handle 3, outer housing 2, inner magnetic cartridge 14 and guide cartridge assembly all rotate clockwise or counterclockwise (relative to FIG. 3), and the ball 11 rotates, but the first and second flanges 1, 9 and inner housing 5 remain stationary.

Figure 27:
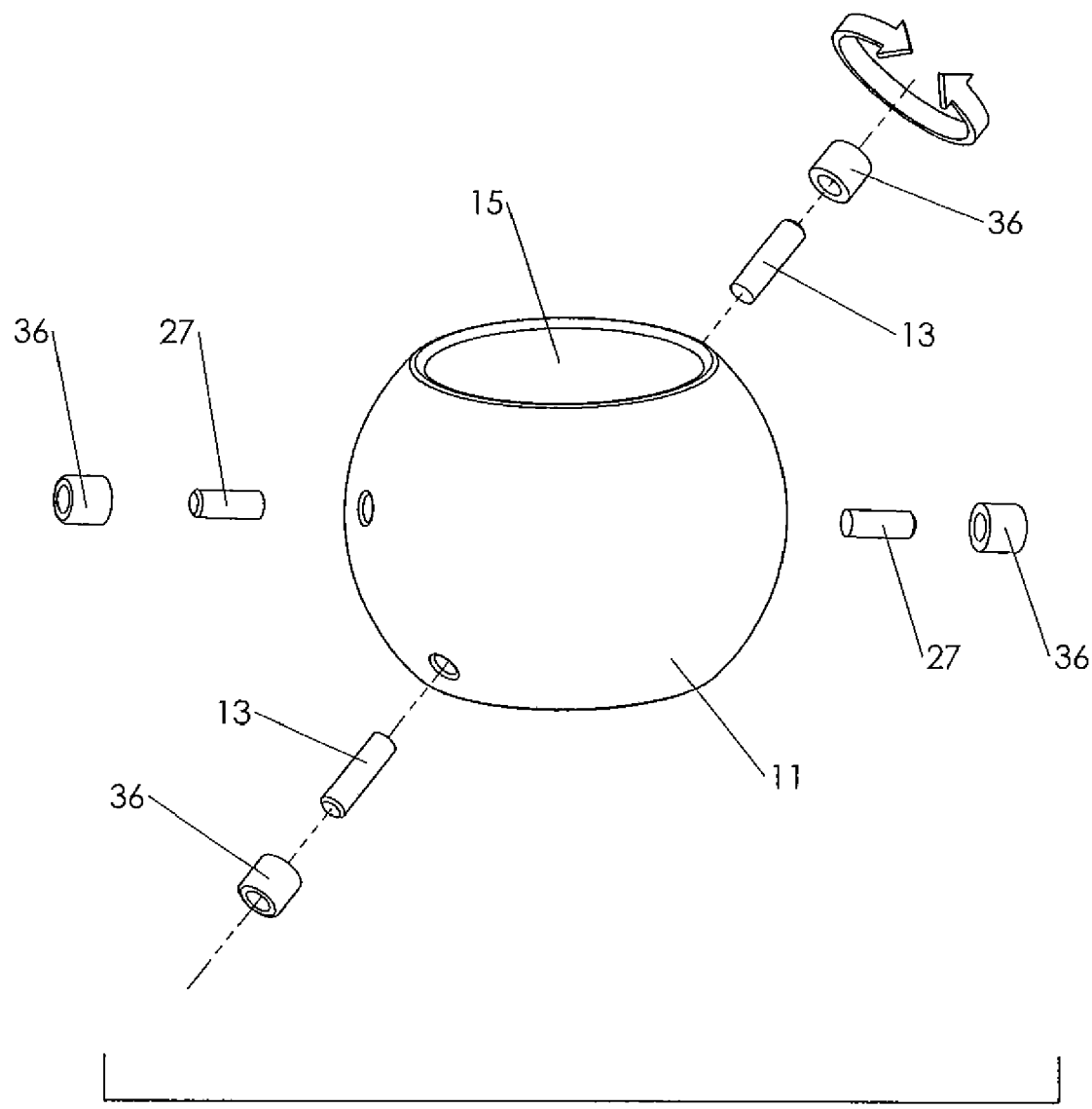
FIG. 27 is an exploded view of the ball, pins and sleeve bearings of the present invention.

FIG. 27 is an exploded view of the ball, pins and sleeve bearings of the present invention. As shown in this figure, each axis pin 13 and each travel pin 27 preferably comprises a tip 36. The tips 36 of the axis pins 13 allow them to rotate within the notches 32 in the first and second flanges 1, 9. The tips 36 of the travel pins 27 allow them to move smoothly up and down within the channels 28 in the guide sleeve 22, 23. In a preferred embodiment, the tips 36 of the axis and travel pins 13, 27 are comprised of polytetrafluoroethylene (PTFE) a/k/a TEFLON® or polychlorotrifluoroethylene (PCTFE).

Figure 28:
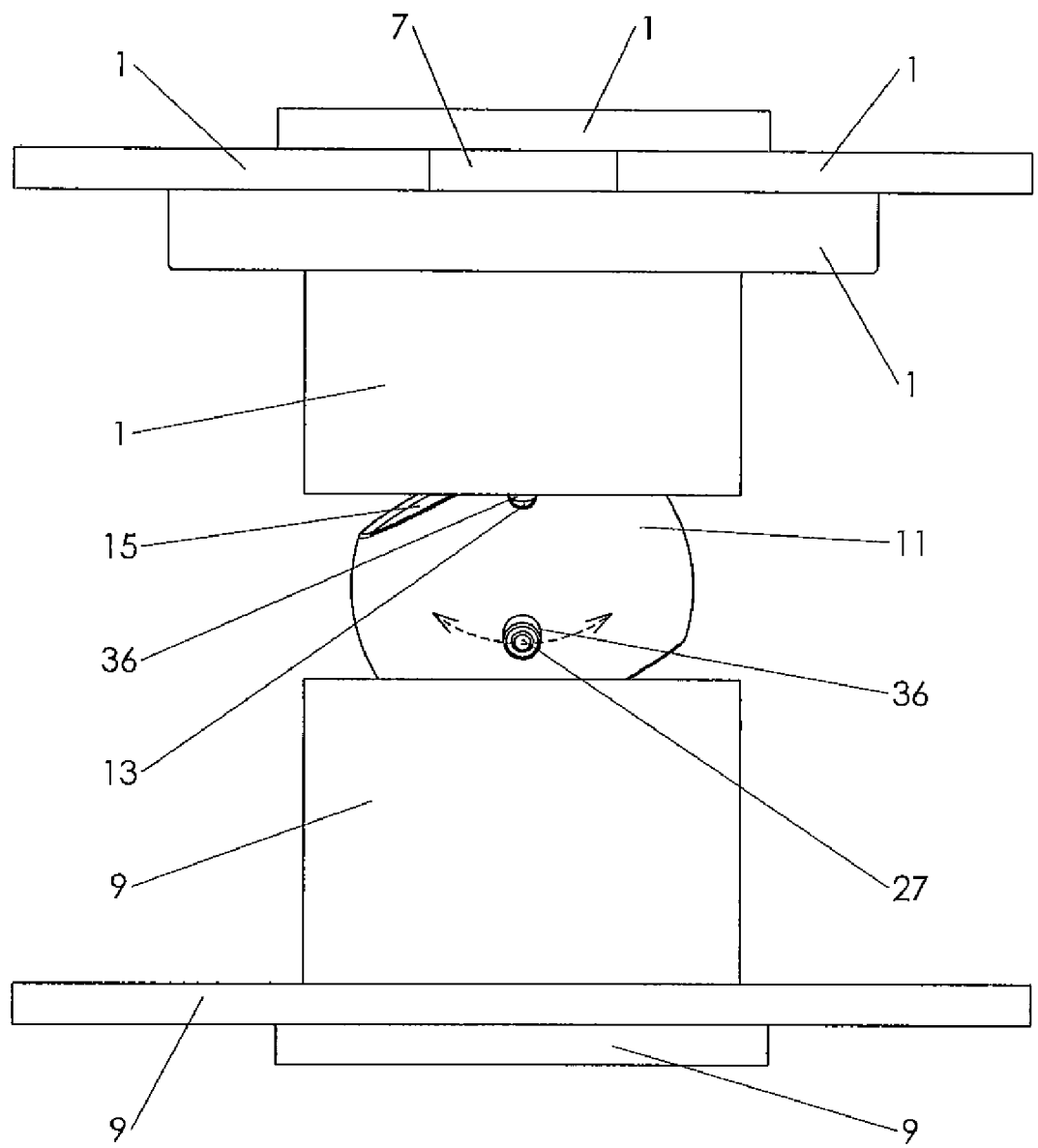
FIG. 28 is a side view of the flanges, ball and travel and axis pins.

FIG. 28 is a side view of the flanges, ball and travel and axis pins. As shown in this figure, as the travel pin 27 moves up and down within the channel 28 in the guide sleeve 22, 23 (not shown), it actually moves in an upside-down arc, as shown by the dotted line with an arrow on either end. When the travel pin 27 is in its lowest position within the channel 28, as it is in this figure, the travel pins 27 are in plane with the axis pins 13 and the flanges 1, 9. (In this position, the ball valve is partially closed.)

Figure 29:
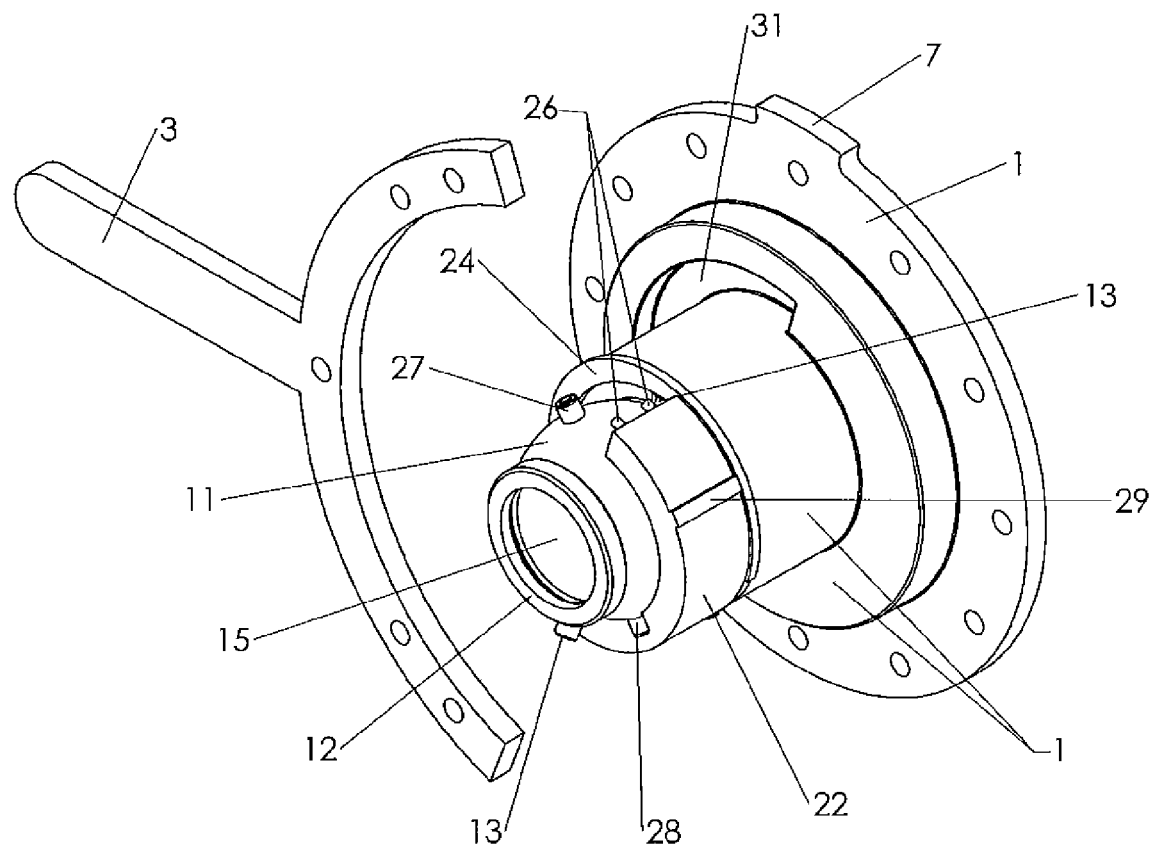
FIG. 29 is a perspective view of the handle, first flange, first internal retaining ring, first half of the guide cartridge, ball and ball sleeve shown in a fully open valve position.
Figure 30:
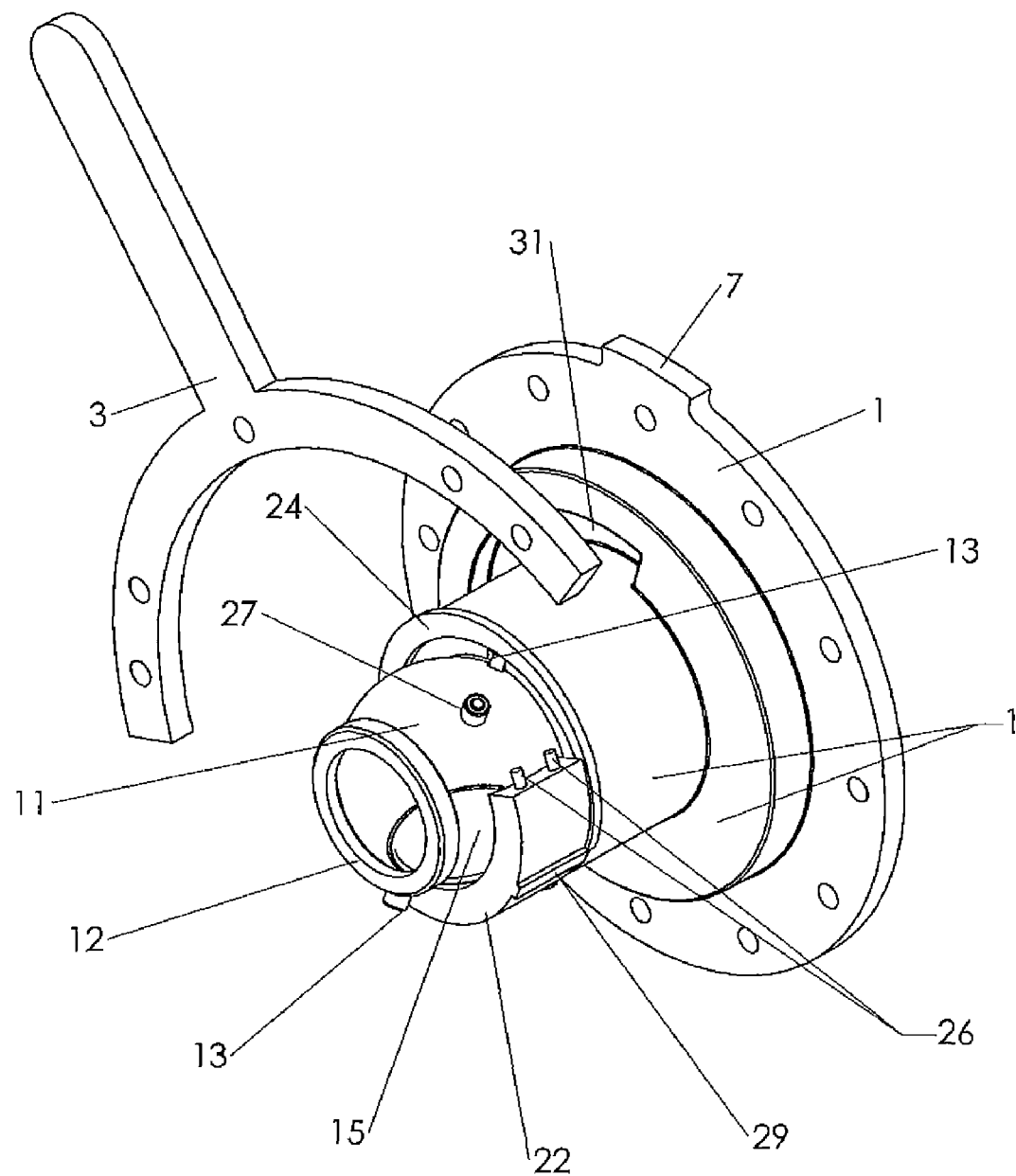
FIG. 30 is a perspective view of the handle, first flange, first internal retaining ring, first half of the guide cartridge, ball and ball sleeve shown in a partially closed valve position.
Figure 31:
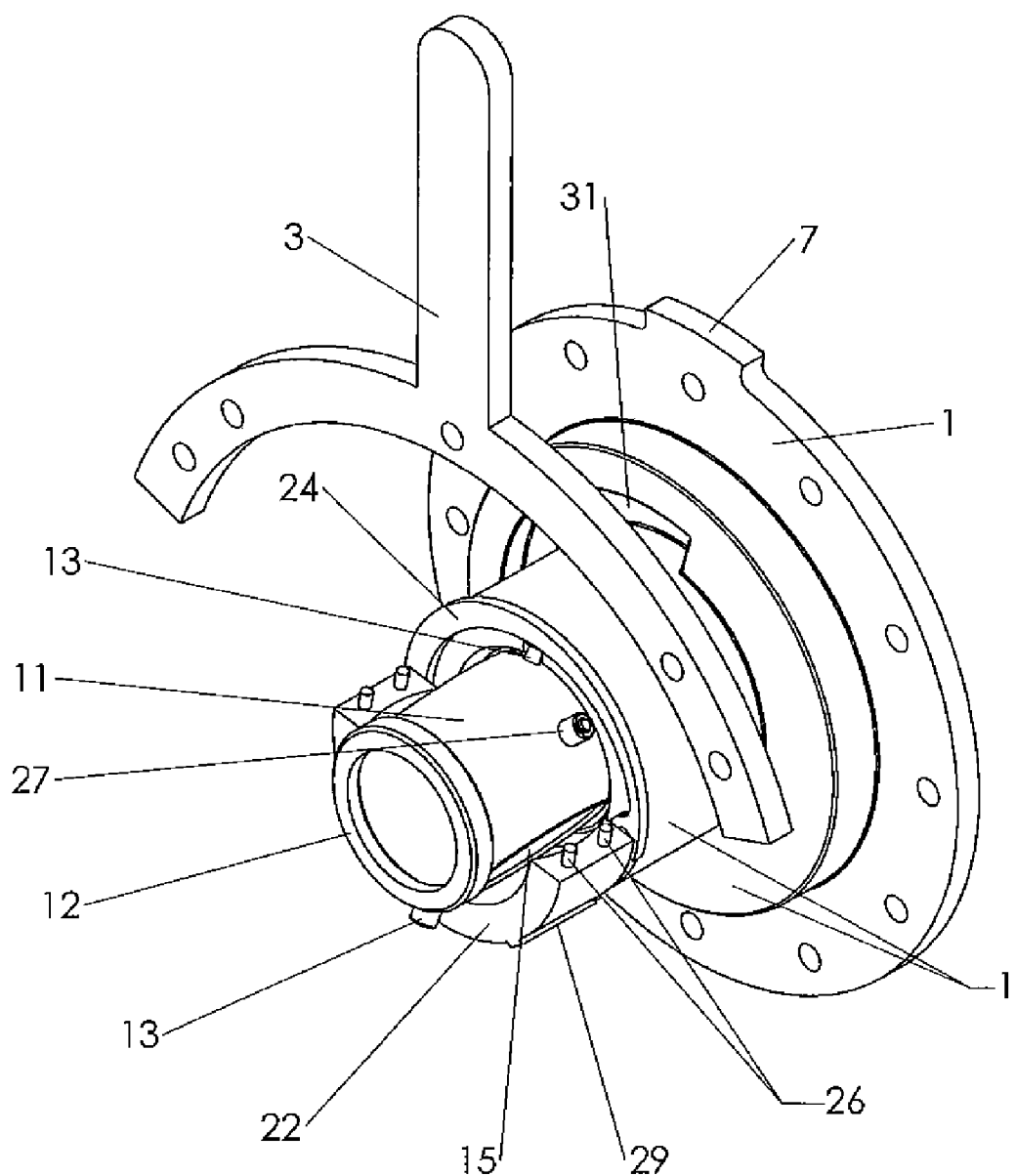
FIG. 31 is a perspective view of the handle, first flange, first internal retaining ring, first half of the guide cartridge, ball and ball sleeve shown in a fully closed valve position.

FIGS. 29, 30 and 31 are perspective views of the handle, first flange, first internal retaining ring, first half of the guide sleeve, ball and ball sleeve 12 shown in a fully open valve position, partially closed valve position, and fully closed valve position, respectively. These three figures correspond to the valve positions shown in FIGS. 3, 4 and 5, respectively.

FIG. 32 is a perspective view of the first flange and inner magnetic cartridge of the present invention. As illustrated in this figure, the internal stop 19 on the inner magnetic cartridge rides fits within the internal recess 31 on the first flange 1. The internal recess 31 extends around the inner part 1*a* of the first flange 1 by ninety degrees) (90°), thereby preventing the inner stop 19 (and the inner magnetic cartridge 14) from rotating more than ninety degrees) (90°). The reason it is important to prevent the inner magnetic cartridge 14 and guide sleeve 22, 23 from rotating more than ninety degrees) (90°) is so that the travel pins 27 will not travel further than the ends of the channels 28 in the guide sleeve 22, 23.

FIGS. 33-44 represent an alternate embodiment of the present invention in which the ball lies not inside the inner magnetic cartridge but inside of a cartridge guide holder that lies adjacent to and is mechanically coupled to the inner magnetic cartridge. This alternate embodiment allows a larger-diameter ball valve to be used with the same size magnetic cartridges, thereby increasing the overall flow capacity of the valve without increasing the overall size of the valve.

Figure 33:
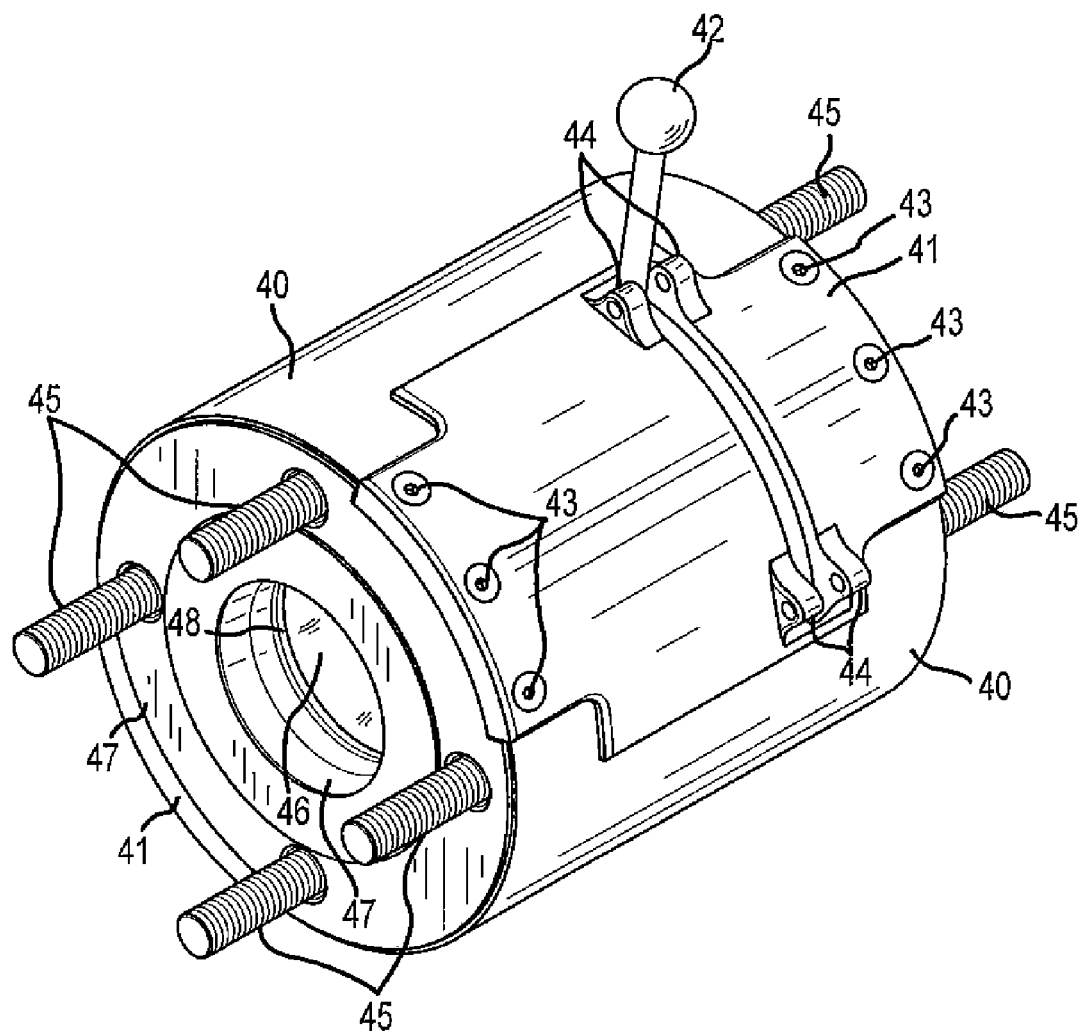
FIG. 33 is a perspective view of an alternate embodiment of the present invention.

FIG. 33 is a perspective view of the present invention showing the plastic shroud 40, the metal shroud 41, and the handle 42. The metal shroud is secured to the plastic shroud 40 with screws 43 and preferably comprises two pairs of locking brackets 44 so that the handle may be locked in an open or closed position via clips or pins (not shown) inserted through each pair of locking brackets. This figure also shows the studs 45 that are used to fasten the valve to other piping (not shown). As shown in subsequent figures, the ball 46 is situated between the left flange 47 and the right flange (not shown), and there is a ball seal 48 on either side of the ball 46.

Figure 34:
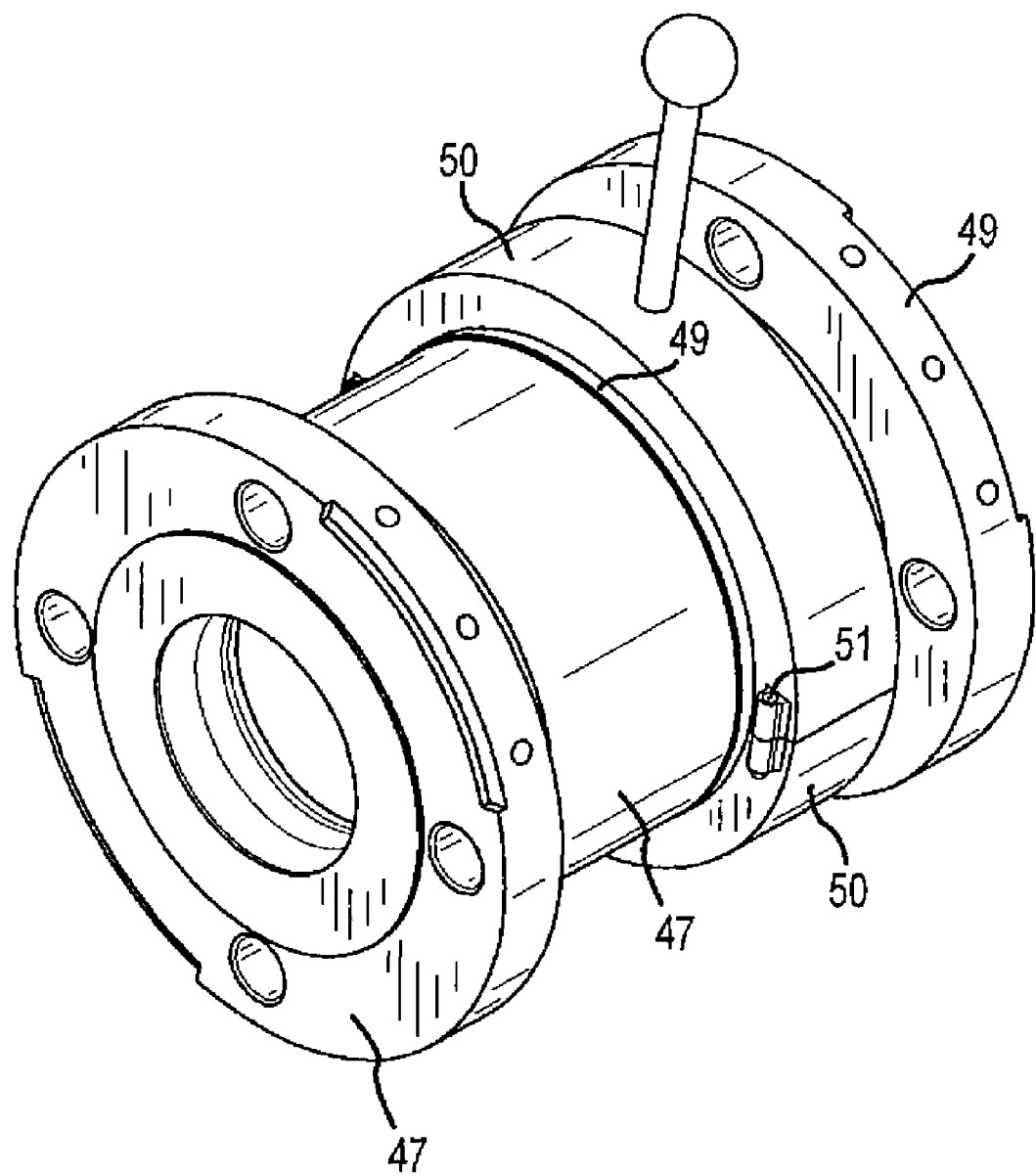
FIG. 34 is a perspective view of an alternate embodiment of the present invention with the plastic shroud, metal shroud, screws and studs removed.
Figure 35:
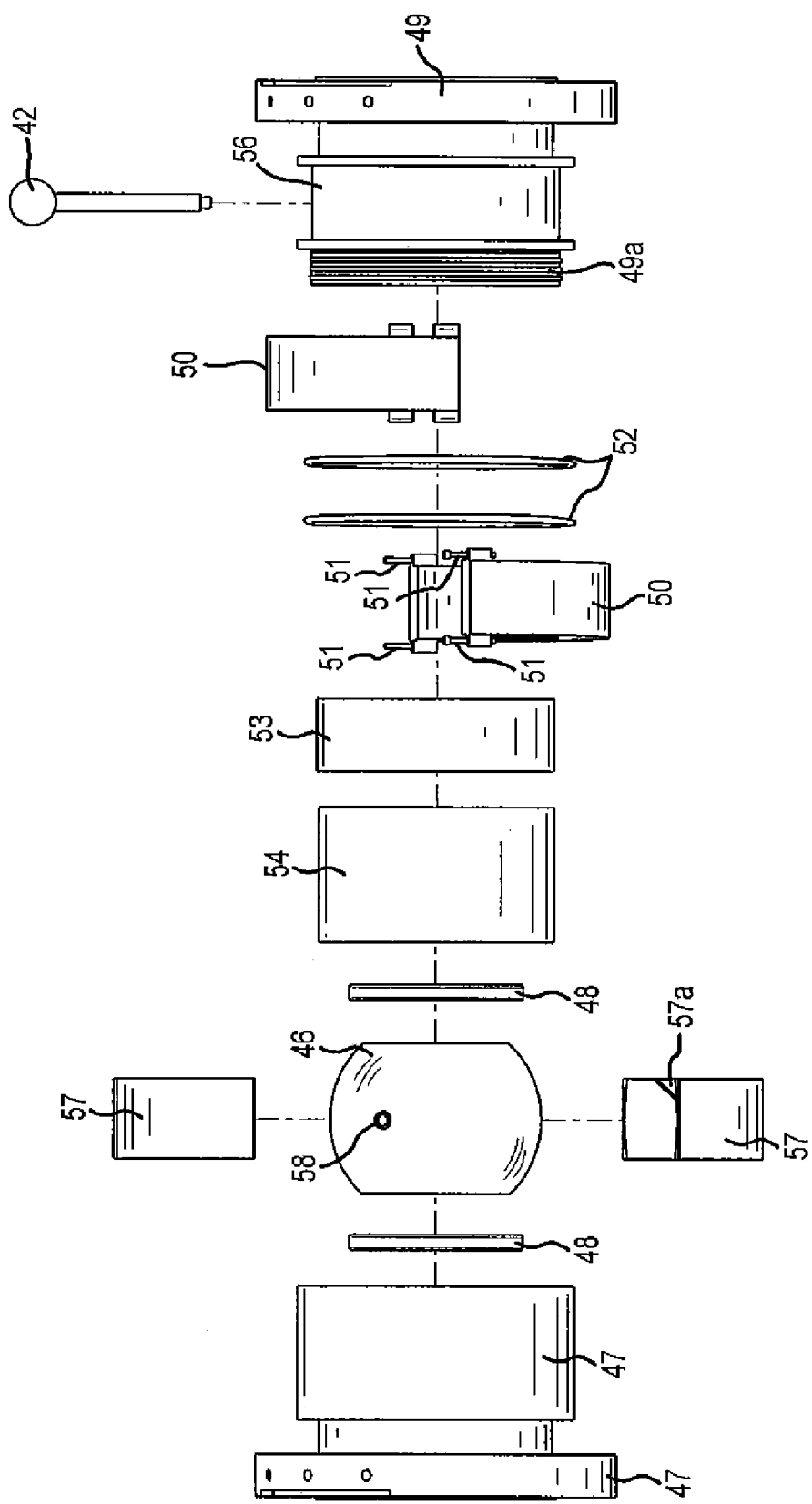
FIG. 35 is an exploded view of an alternate embodiment of the present invention with the plastic shroud, metal shroud, screws and studs removed.
Figure 35A:
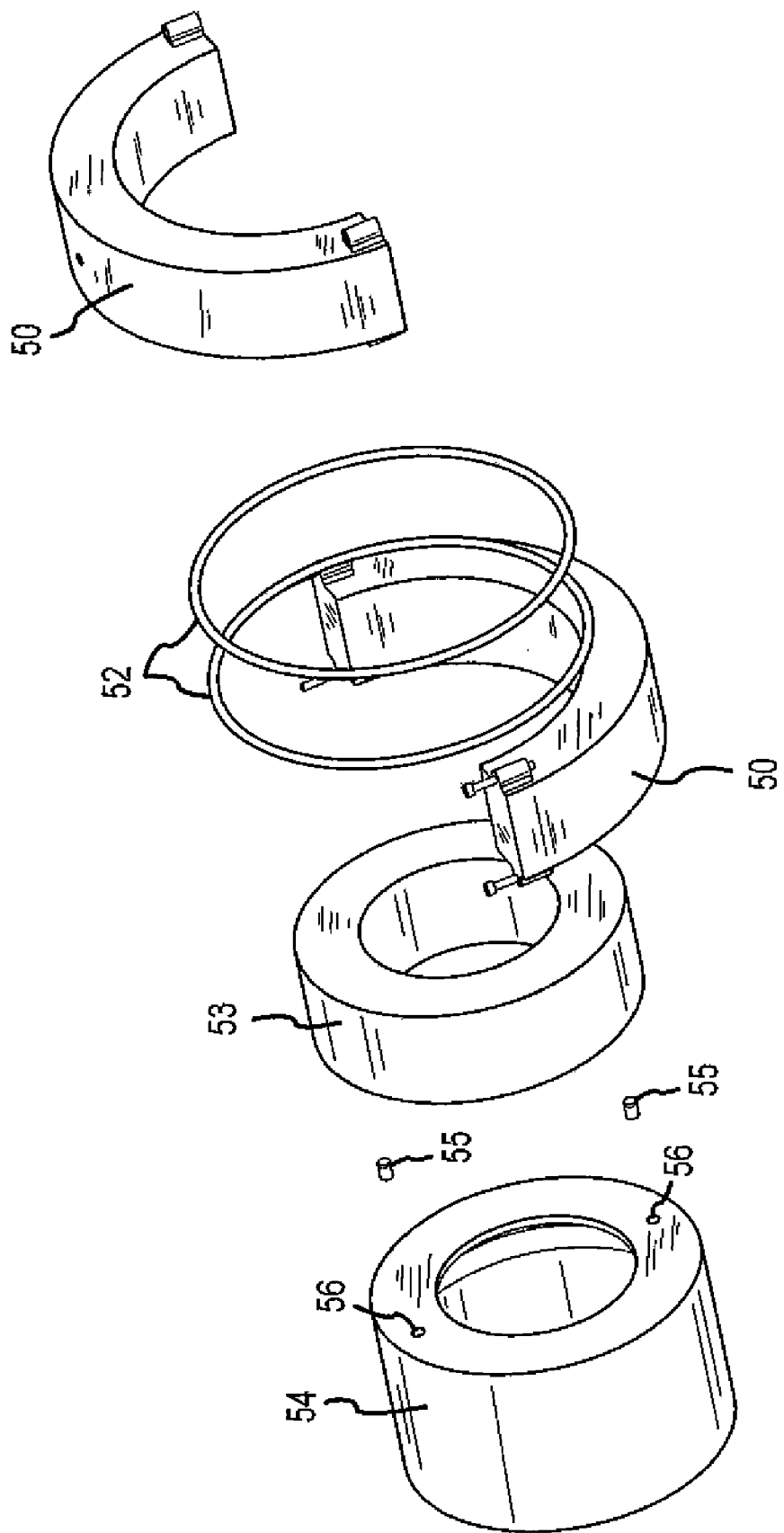
Figure 43:
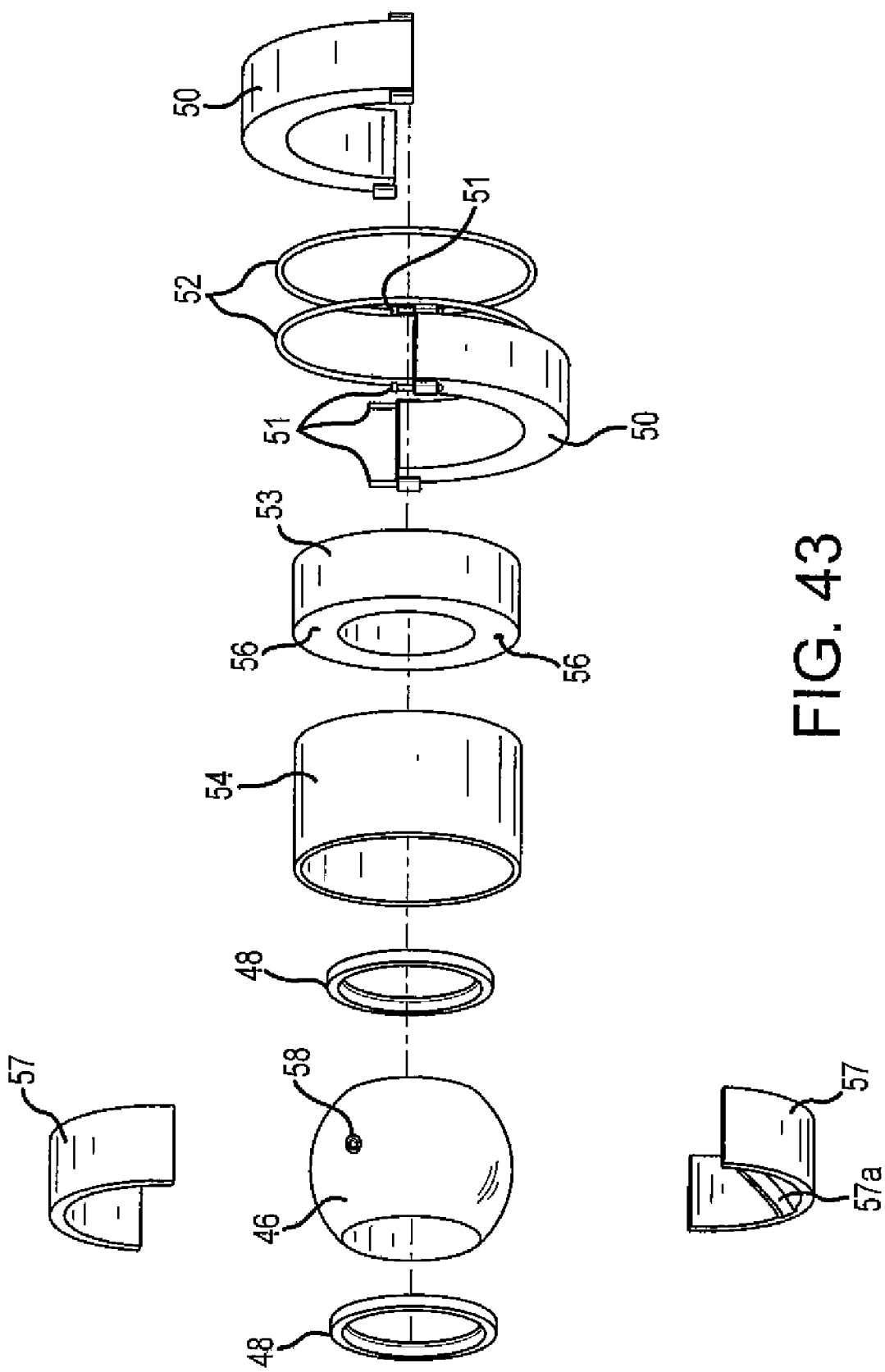
FIG. 43 is an exploded view of an alternate embodiment of the present invention with the plastic shroud, metal shroud, screws, studs, right and left flanges and handle removed.
Figure 44:
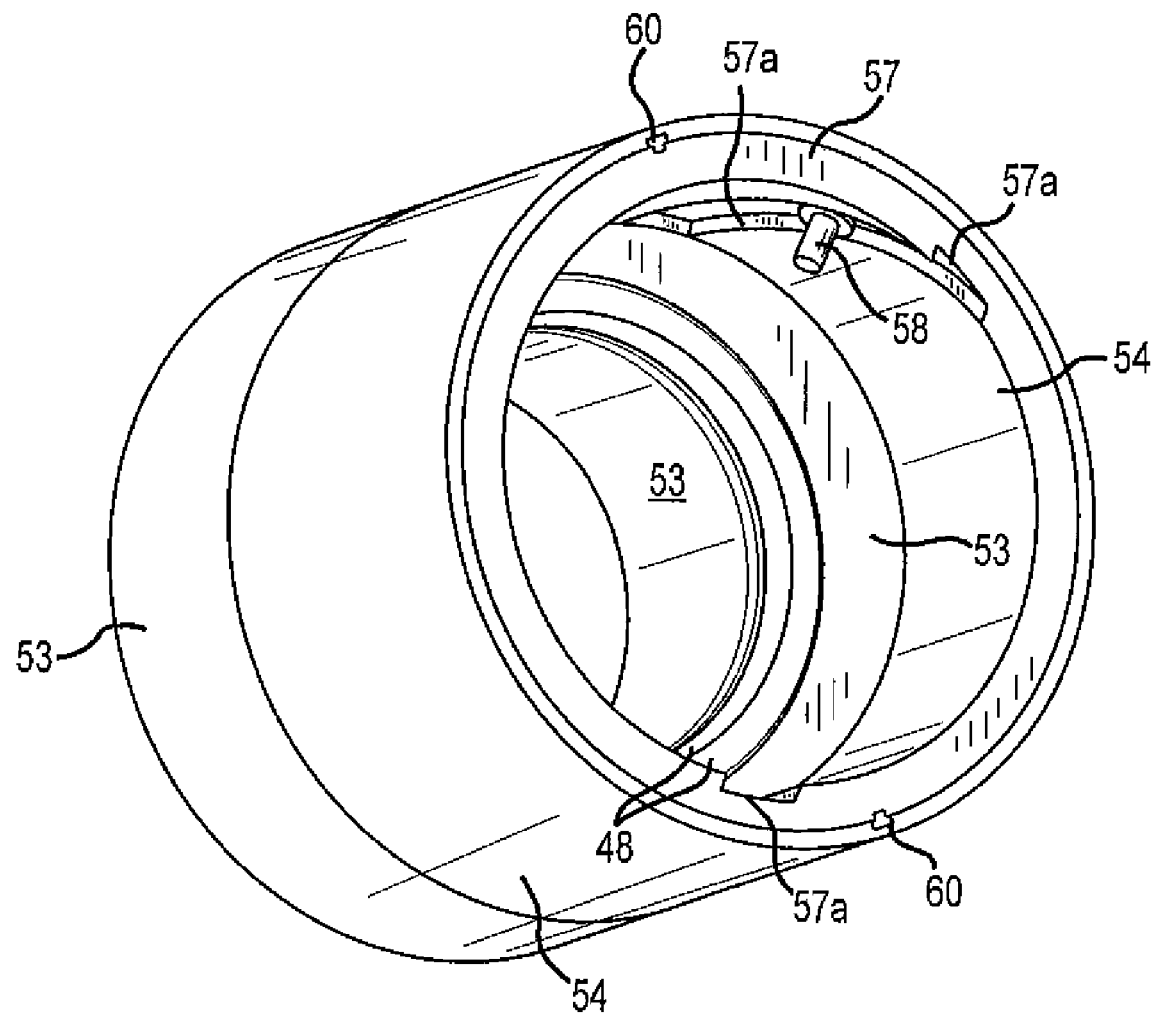
FIG. 44 is a perspective view of the inner magnetic cartridge, cartridge guide holder and guide sleeve.

FIG. 34 is the same perspective view shown in FIG. 43 but with the plastic shroud 40, metal shroud 41, screws 43 and studs 45 removed. This figure shows the right flange 49 and the outer magnetic cartridge 50, which is in the form of two semi-circles (see FIG. 35A) attached by a screw 51 and that fit around the right flange 49. As shown in FIGS. 35 and 44, the right flange 49 comprises a threaded part 49*a* that screws into a threaded part (see FIG. 39B) on the left flange 47. The handle 42 is attached to the outer magnetic cartridge 50 so that when the handle 42 is rotated, the outer magnetic cartridge 50 also rotates.

FIG. 35 is an exploded view of the parts shown in FIG. 34. This figure shows the right flange, handle 42, and two halves of the outer magnetic cartridge 50 attached together by screws 51. Two O-rings 52 preferably lie on either side of the outer magnetic cartridge 50 to prevent dirt and debris from inhibiting the smooth rotation of the outer magnetic cartridge 50.

This figure also shows the inner magnetic cartridge 53 and the cartridge guide holder 54. The inner magnetic cartridge 53 is preferably secured to the cartridge guide holder 54 with pins or bolts 55 that extend through recesses 56 in both the inner magnetic cartridge 53 and the cartridge guide holder 54 to ensure that the inner magnetic cartridge 53 and cartridge guide holder 54 rotate together (see FIG. 35A).

When the valve is fully assembled, the center portion 56 of the right flange 49 lies between the outer magnetic cartridge 50 and the inner magnetic cartridge 53. The strength and size of the magnets in the inner and outer magnetic cartridges is such that as the outer magnetic cartridge 50 is rotated by the handle 42, the inner magnetic cartridge 53 rotates as well, causing the cartridge guide holder 54 to rotate at the same time due to the fact that the inner magnetic cartridge 53 is attached to the cartridge guide holder 54 by pins or bolts.

Figure 36:
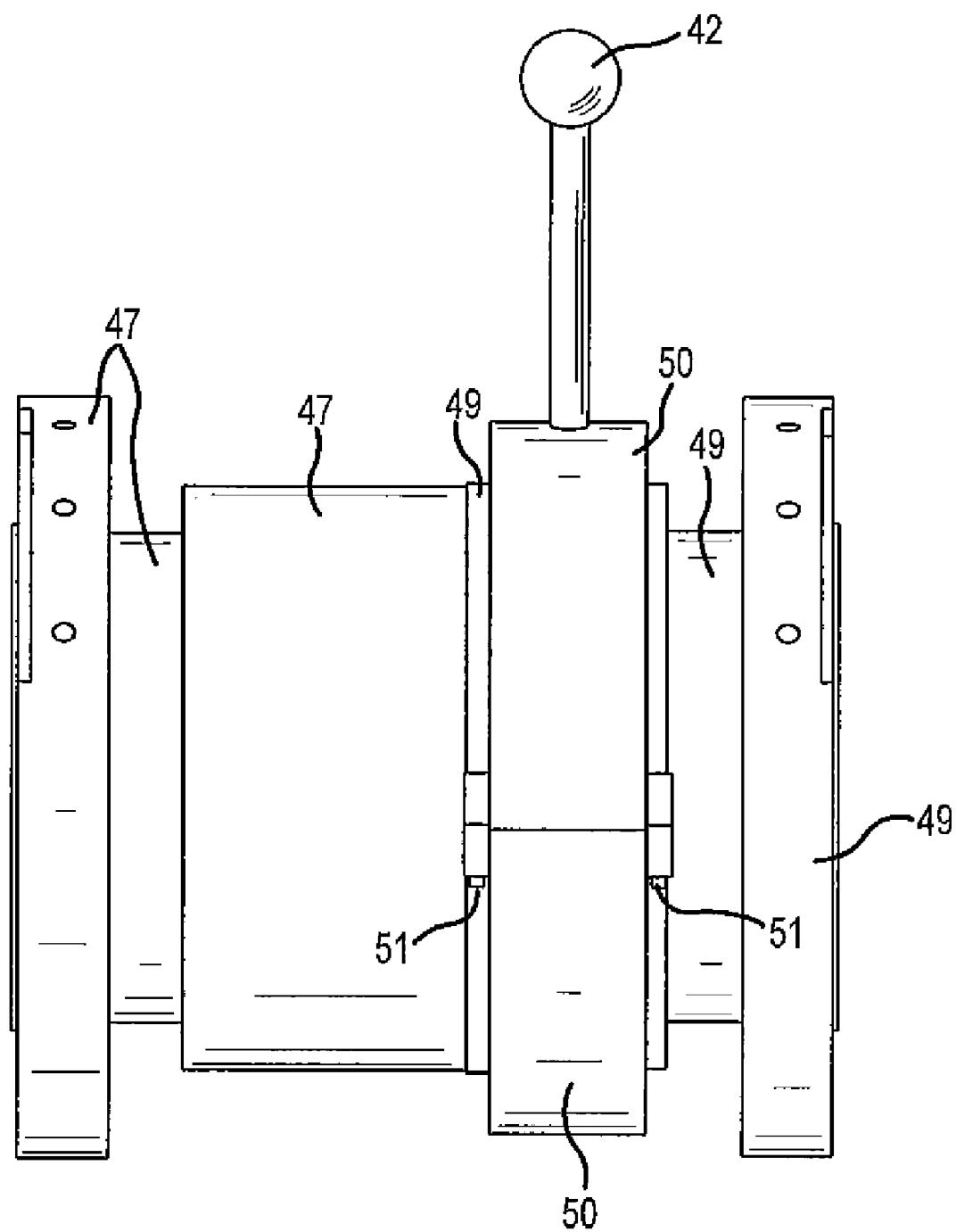
FIG. 36 is an unexploded side view of the parts shown in FIG. 35.

FIG. 35 also shows the ball 46, ball seals 48 on either side of the ball 46, and left flange 47. A guide sleeve 57 fits inside of the cartridge guide holder 54 and serves a similar purpose as the guide sleeve 22, 23 described above in connection with the earlier embodiment. In this embodiment, the ball 46 comprises two travel pins 58 (only one of which is shown in FIG. 35) and one axis pin 59 (see FIG. 39). As described more fully below, the travel pins 58 move through channels in the inside of the guide sleeve 57, thereby causing the ball 46 to rotate and the ball valve to open or close. FIG. 36 is the same view as that shown in FIG. 35 but with the parts unexploded.

Figure 37:
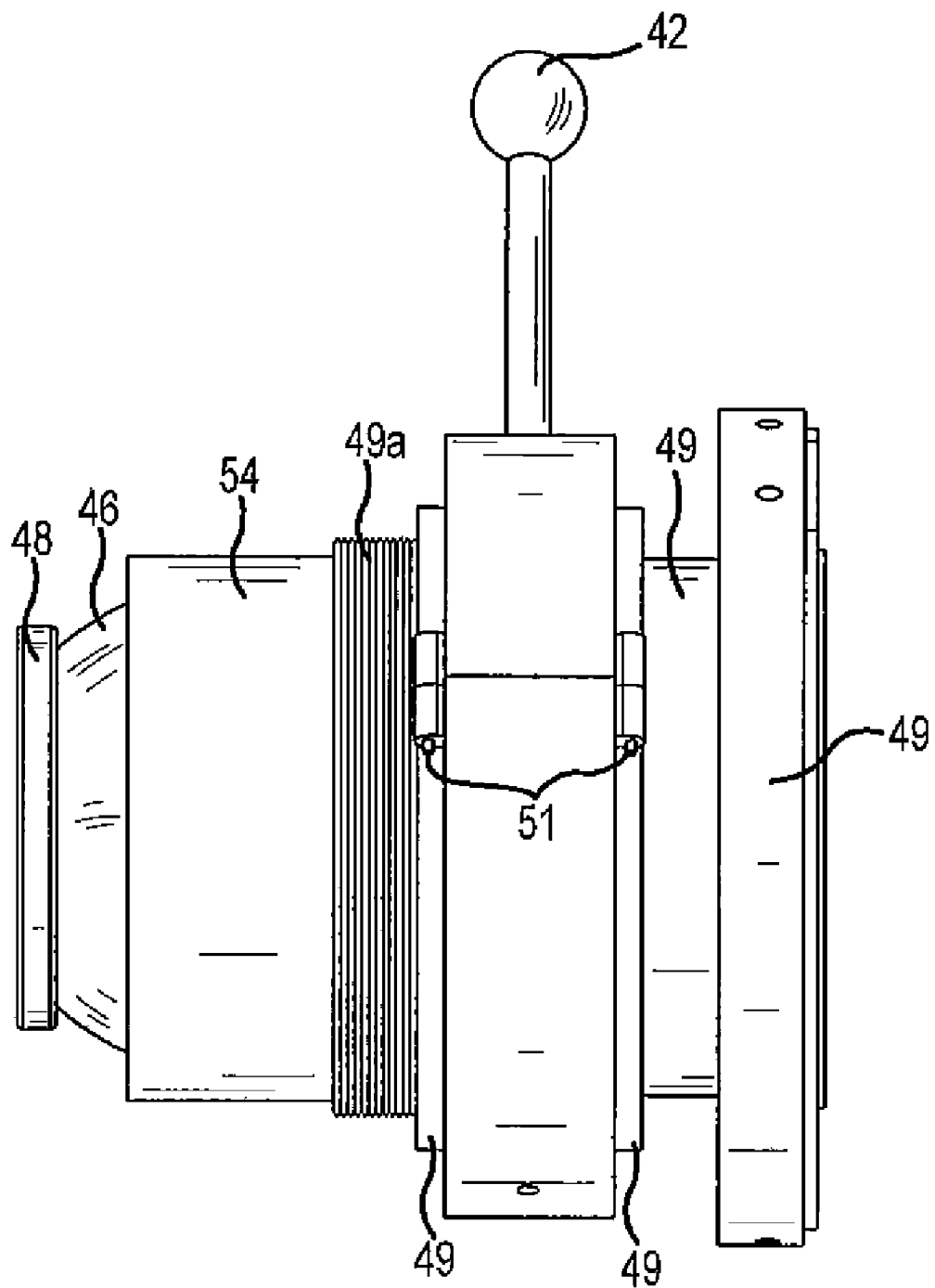
FIG. 37 is an unexploded side view of the parts shown in FIG. 35 but excluding the left flange.
Figure 38:
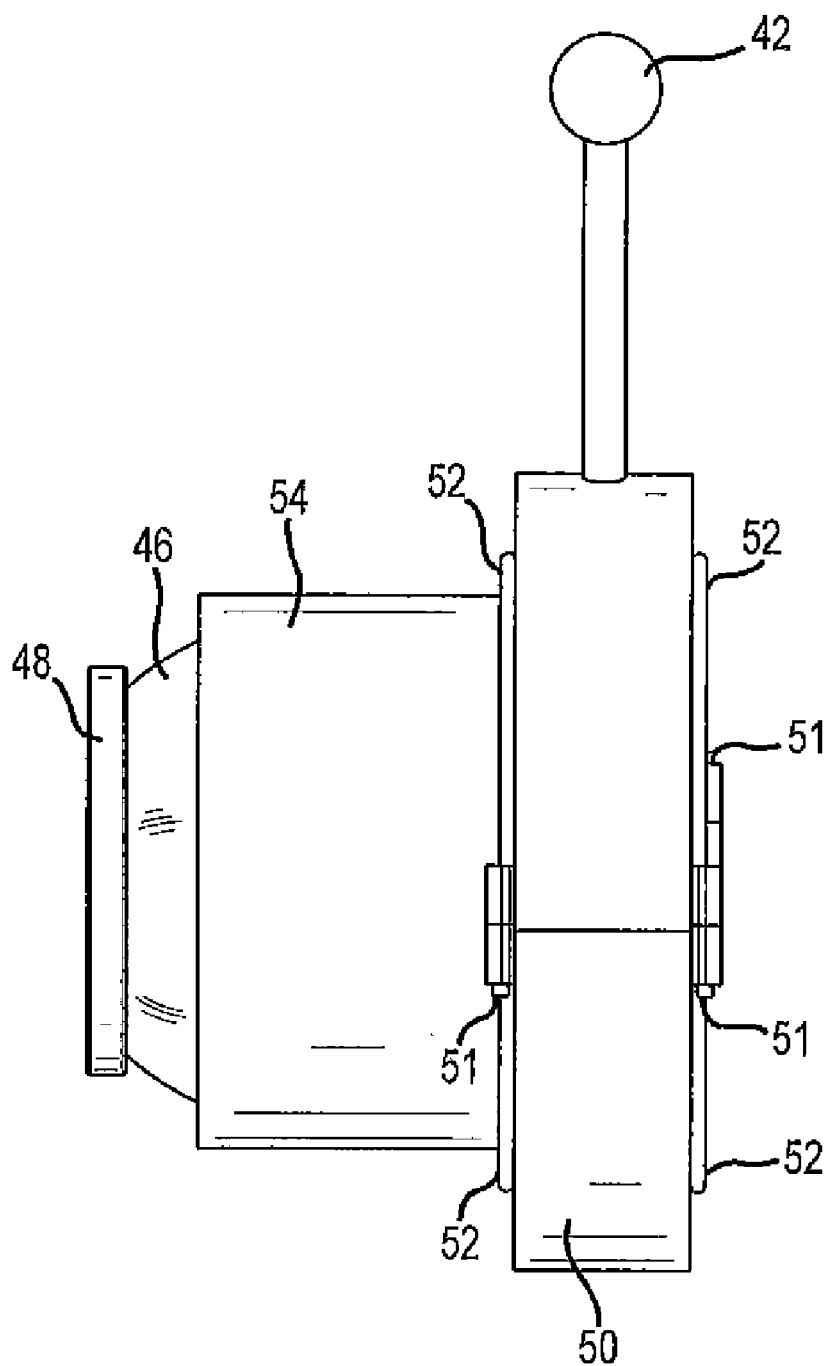
FIG. 38 is an unexploded side view of the parts shown in FIG. 35 but excluding the right and left flanges.

FIG. 37 is the same view as shown in FIG. 36 but with the left flange 47 removed; thus, the ball 46 and seal 48 are visible in this figure. FIG. 38 is the same view as shown in FIG. 37 but with the right flange 49 removed as well.

Figure 39:
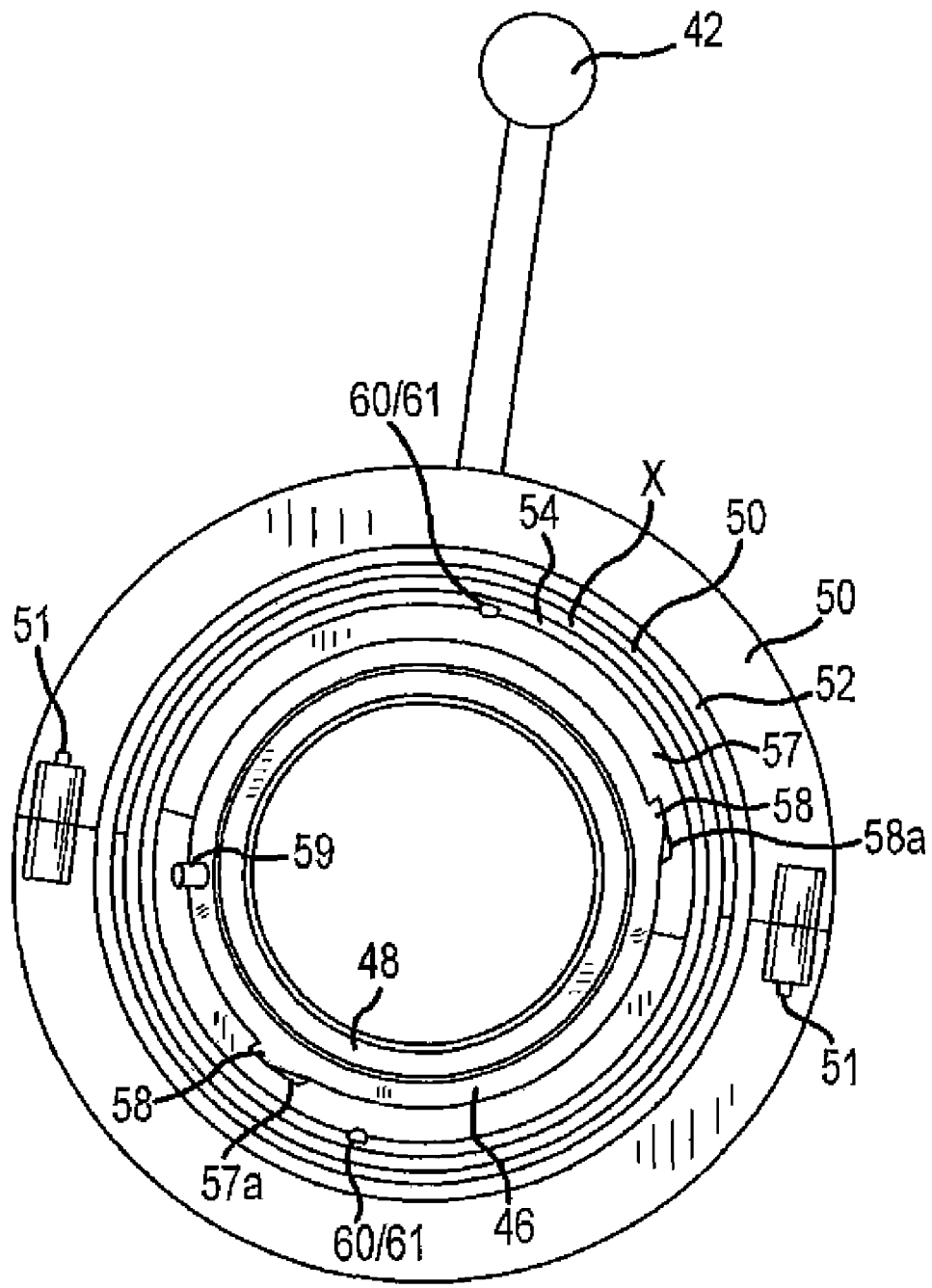
FIG. 39 is a front view of the parts shown in FIG. 38.

FIG. 39 is a front view (from the vantage point of the left flange 47, which has been omitted in this figure) of the same parts shown in FIG. 38; thus, the right 49 and left 47 flanges have been omitted from this figure. This figure shows the handle 42, outer magnetic cartridge 50 and O-ring 52, There is gap (denoted with an "X" on FIG. 39) between the outer magnetic cartridge 50 and the cartridge guide holder 54; the right 49 and left 47 flanges would normally extend into this gap (the right flange 49 being between the inner and outer magnetic cartridges 53, 50 and the left flange 47 surrounding the cartridge guide holder 54).

Figure 39A:
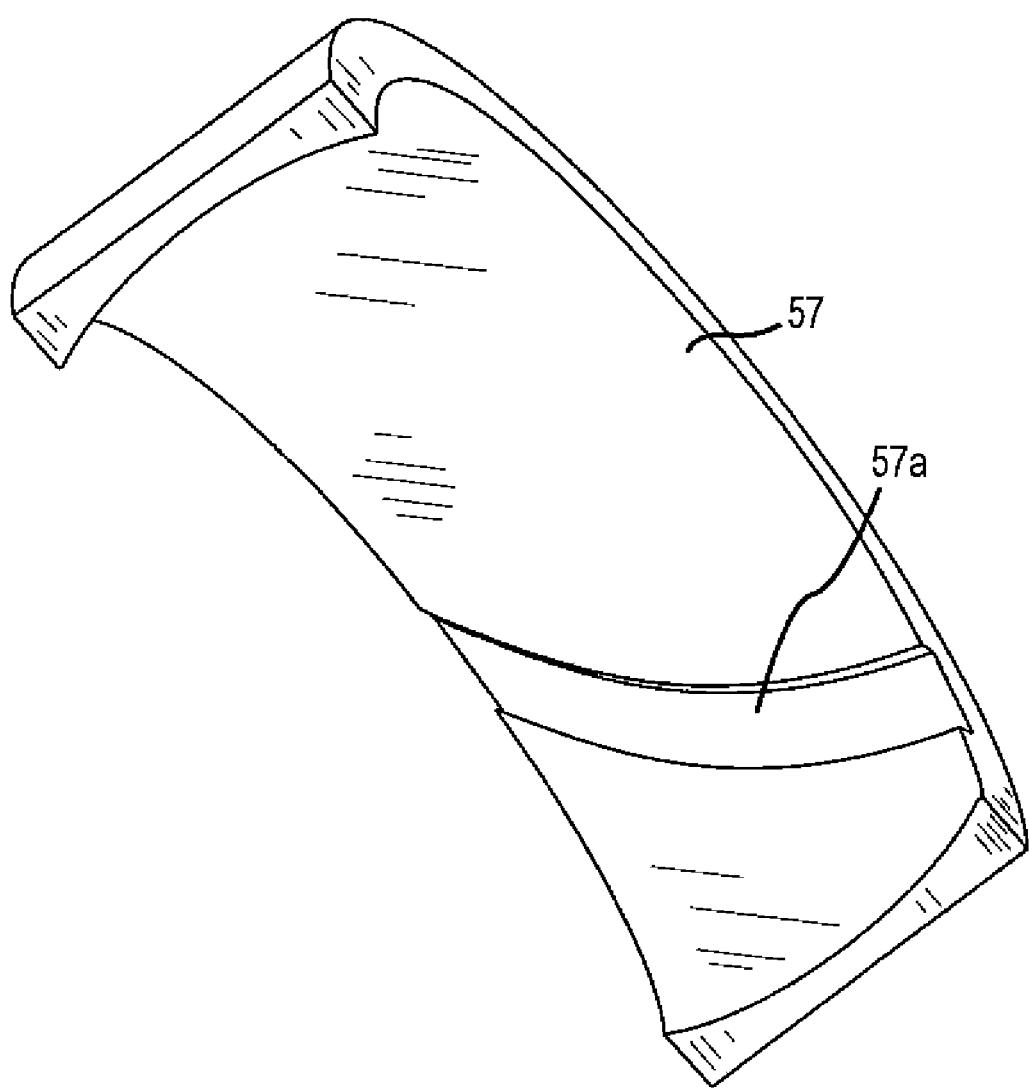

This figure also shows the guide sleeve 57, which has two preferably curved channels 57a in it through which the travel pins 58 on the ball 46 move. As explained above, the travel pins 58 move through the channels 57a in the guide sleeve 57 when the cartridge guide holder 54 is rotated by the inner magnetic cartridge 53, which in turn is rotated by the outer magnetic cartridge 50. Although the channels 57a are preferably curved (see FIG. 39A), they may also be straight (as shown, for example, in FIG. 11).

Figure 39B:
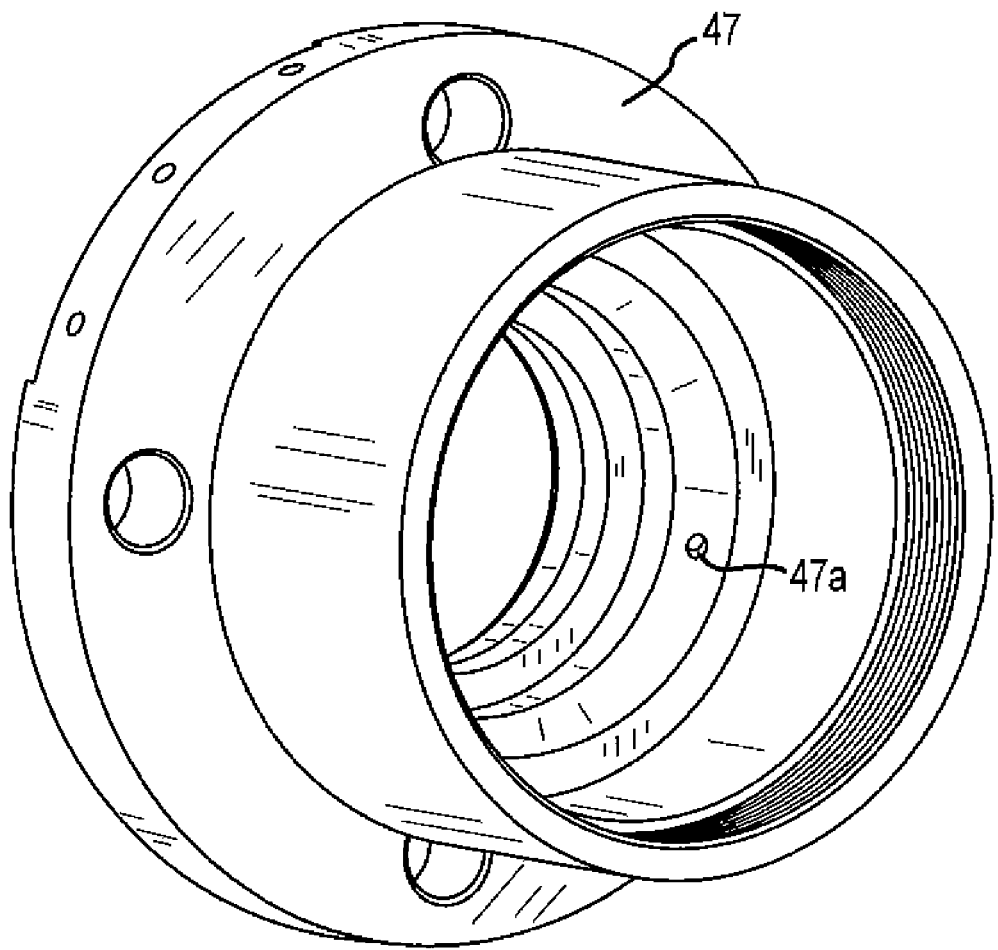
Figure 40:
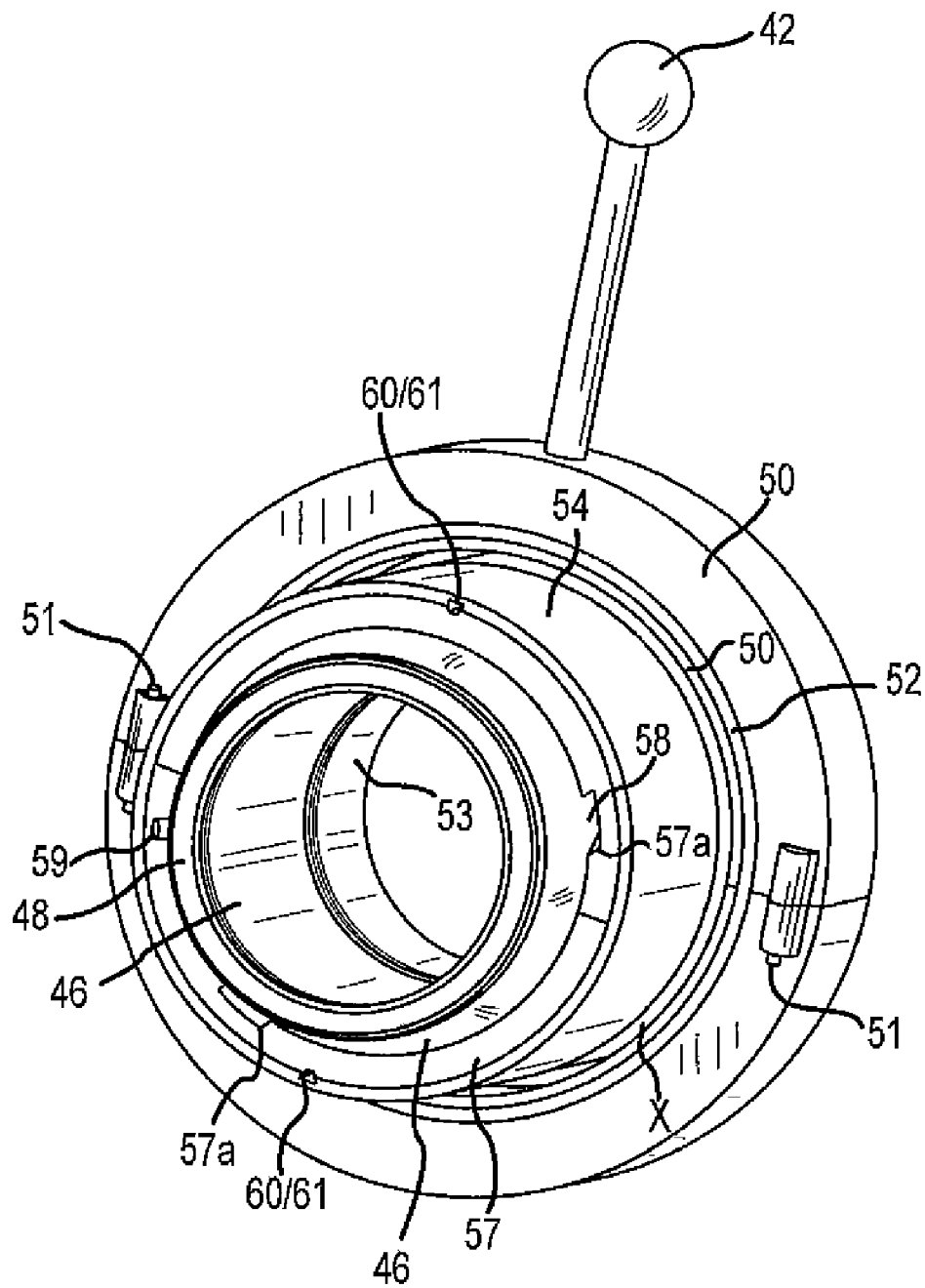
FIG. 40 is a perspective view of the parts shown in FIG. 39.

FIG. 39 also shows the single axis pin 59, which fits into a recess 47a in the left flange 47 (see FIG. 39B). Although only one axis pin 59 is necessary, two axis pins could be used (one fitting into each of the two flanges) or a single axis pin could be used to fit into the right flange 49. As shown in FIG. 39, there is a longitudinal key slot 60 in the guide sleeve 57 and cartridge guide holder 54, and a key 61 fits into each key slot 60 to hold the guide sleeve 57 and cartridge guide holder 54 together. FIG. 40 is a perspective view of the same parts shown in FIG. 39.

Figure 41:
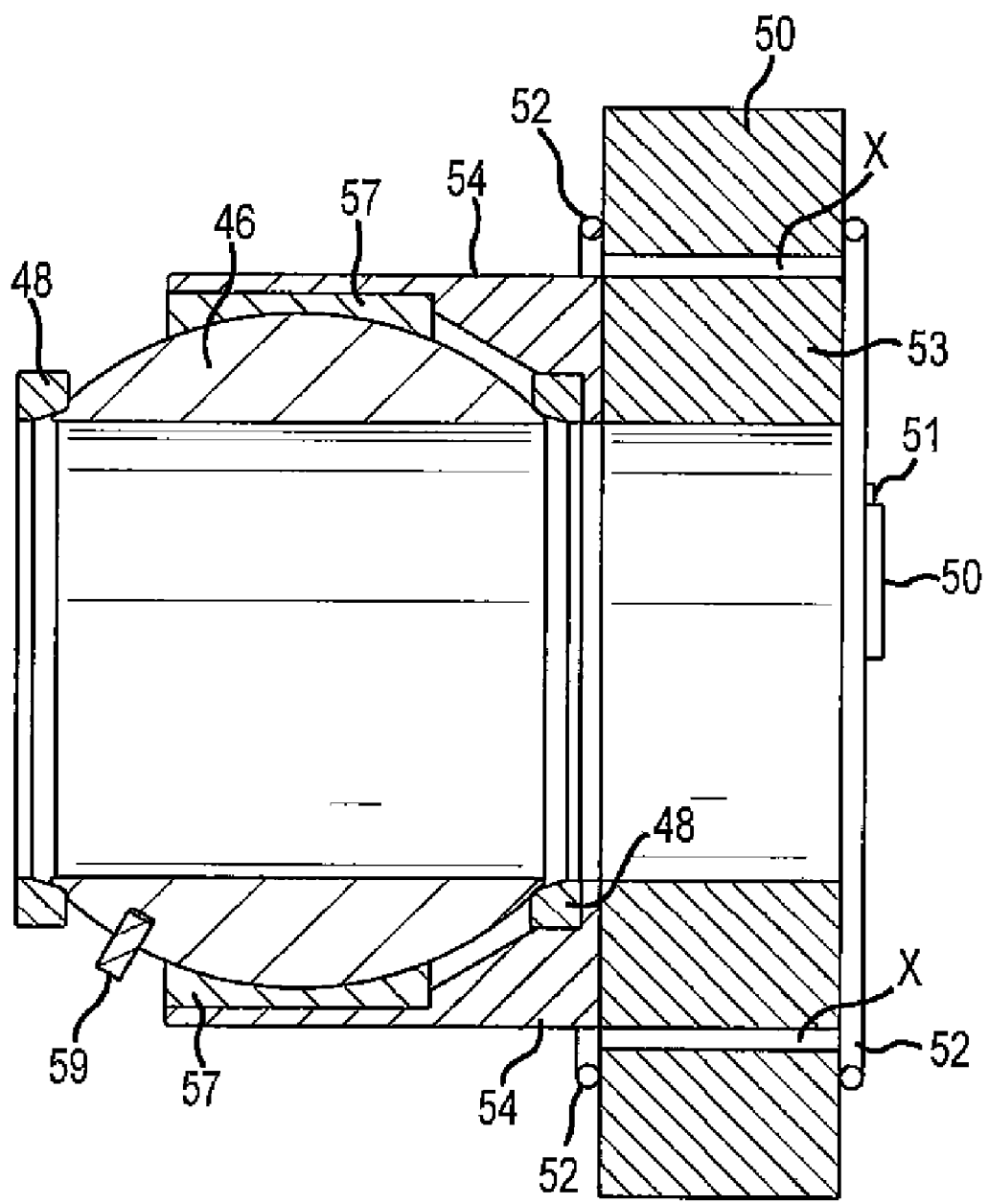
FIG. 41 is a section view of the parts shown in FIGS. 39 and 40.
Figure 42:
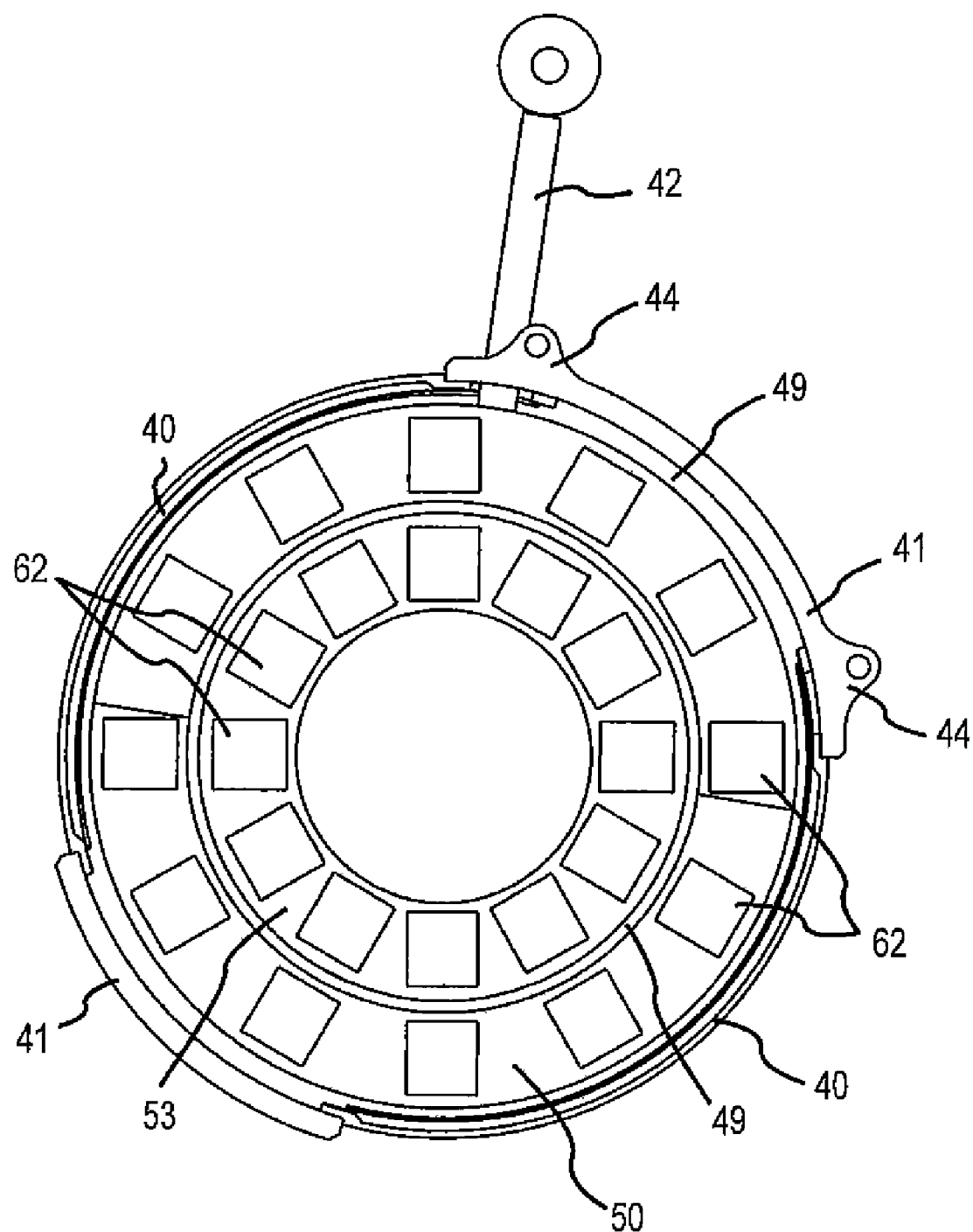
FIG. 42 is a section view of the inner and outer magnetic cartridges.

FIG. 41 is a section view of the present invention showing the same parts as in FIGS. 39 and 40. Note that right flange 49 (not shown) would ordinarily be in the gap denoted with an "X" on FIG. 41. FIG. 42 is a section view of the inner and outer magnetic cartridges showing the alignment of the magnets 62 inside of the magnetic cartridges. FIG. 43 is an exploded view of many of the same parts shown in FIG. 35. In this figure, the right and left flanges 49, 47 and the handle 42 have been omitted for clarity.

Figure 45:
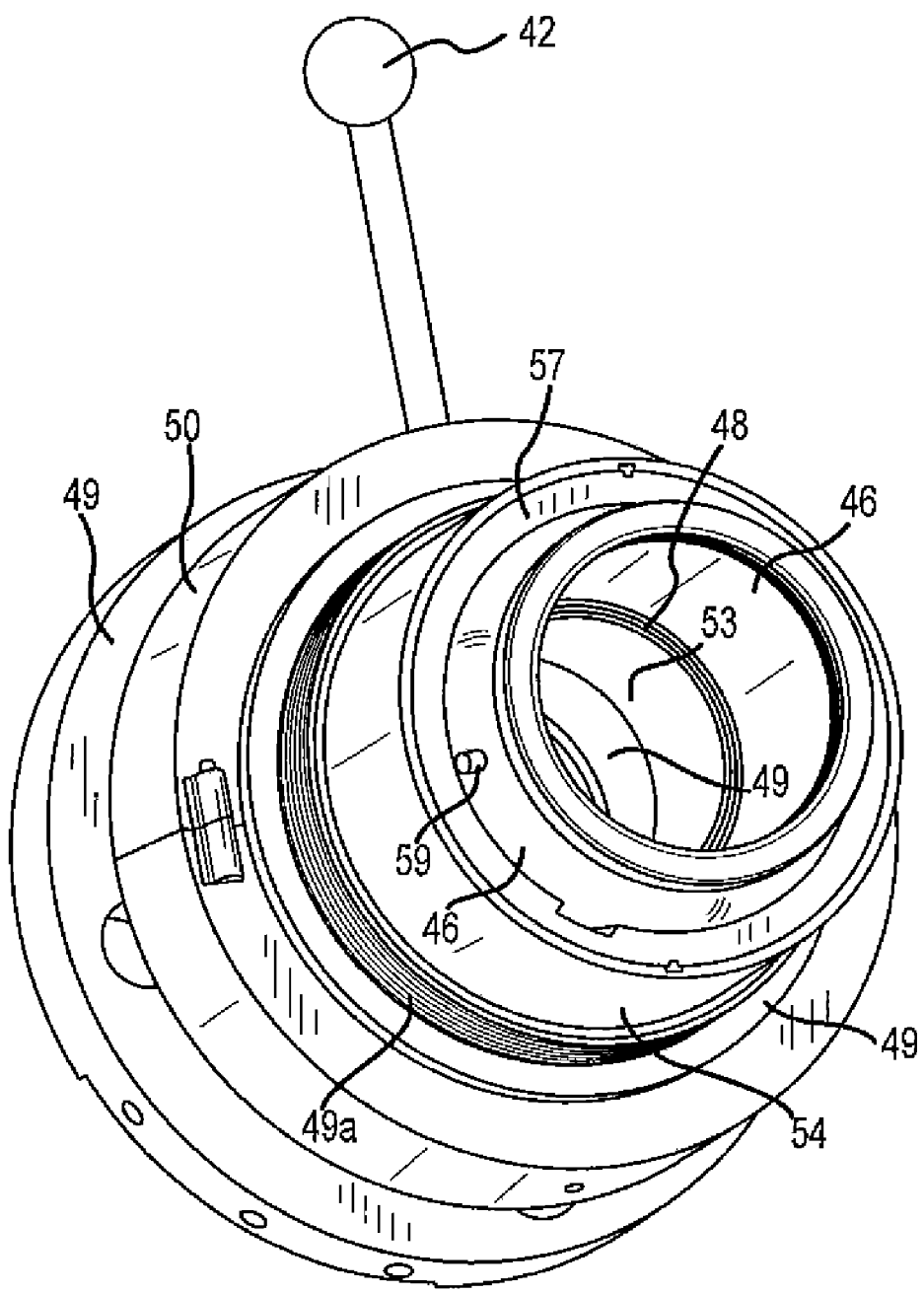
FIG. 45 is a perspective view of the parts shown in FIG. 37.

FIG. 44 is a perspective view of the inner magnetic cartridge 53, cartridge guide holder 54, and guide sleeve 57 showing the channel 57a in the guide sleeve 57 and the travel pin 58 in the channel 57a. The ball 46 has been omitted so that the channel 57a and travel pin 58 are visible, but the travel pin 58 would be fixedly attached to the ball 46. This figure also shows the key slots 60 but not the keys 61, which would be inserted into the key slots 60. FIG. 45 is a perspective view of the same parts shown in FIG. 37.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A stemless ball valve comprising:
    (a) a right flange;
    (b) a left flange;
    (c) a ball with an axis pin and two travel pins;
    (d) a ball seal on either side of the ball;
    (e) a guide sleeve with inner walls comprising two channels;
    (f) a cartridge guide holder;
    (g) an inner magnetic cartridge; and
    (h) an outer magnetic cartridge;
    wherein the ball is situated inside of the guide sleeve such that a travel pin is located in each of the two channels of the guide sleeve;
    wherein the guide sleeve is situated inside of the cartridge guide holder;
    wherein the cartridge guide holder is located adjacent to and outside of the inner magnetic cartridge and is secured to the inner magnetic cartridge such that when the inner magnetic cartridge rotates, the cartridge guide holder also rotates;
    wherein the inner magnetic cartridge is situated inside of the outer magnetic cartridge with a portion of one of the two flanges between the inner and outer magnetic cartridges;
    wherein rotation of the outer magnetic cartridge causes the inner magnetic cartridge to rotate;
    wherein the axis pin is inserted into an aperture in one of the two flanges; and
    wherein the cartridge guide holder is secured to the guide sleeve such that when the cartridge guide holder rotates, the travel pins move within the channels in the inner walls of the guide sleeve, thereby causing the ball to rotate.

2. The stemless ball valve of claim 1, wherein the cartridge guide holder and the inner magnetic cartridge each has an outer diameter, and the outer diameter of the cartridge guide holder and the outer diameter of the inner magnetic cartridge are roughly equal.

3. The stemless ball valve of claim 1, wherein the cartridge guide holder and the inner magnetic cartridge each has an inner diameter, and the inner diameter of the cartridge guide holder and the inner diameter of the inner magnetic cartridge are roughly equal.

4. The stemless ball valve of claim 1, wherein the ball comprises a channel, and wherein rotation of the ball causes the channel to be aligned or disaligned with apertures in the right and left flanges, thereby opening and closing the valve.

5. The stemless ball valve of claim 1, wherein both flanges are threaded, and one flange screws into the other flange.

6. The stemless ball valve of claim 1, wherein the travel pins are separated from one another by one hundred eighty degrees.

7. The stemless ball valve of claim 1, wherein the channels in the guided sleeve are curved.

8. The stemless ball valve of claim 1, wherein the channels in the guided sleeve are straight.

9. The stemless ball valve of claim 1, further comprising a plastic shroud that surrounds the valve.

10. The stemless ball valve of claim 9, further comprising a handle and a metal shroud that is secured to the outside of the plastic shroud and comprises two pairs of locking brackets, wherein the handle is locked in an open or closed position with a clip or pin inserted through one pair of locking brackets.

* * * * *